US012251810B2

(12) United States Patent
Iida et al.

(10) Patent No.: US 12,251,810 B2
(45) Date of Patent: Mar. 18, 2025

(54) POWER TOOL HAVING ROTARY HAMMER MECHANISM

(71) Applicant: MAKITA CORPORATION, Anjo (JP)

(72) Inventors: Hitoshi Iida, Anjo (JP); Masanori Furusawa, Anjo (JP); Kei Watanabe, Anjo (JP)

(73) Assignee: MAKITA CORPORATION, Anjo (JP)

(*) Notice: Subject to any disclaimer, the term of this patent is extended or adjusted under 35 U.S.C. 154(b) by 21 days.

(21) Appl. No.: 17/747,541

(22) Filed: May 18, 2022

(65) Prior Publication Data

US 2022/0395971 A1 Dec. 15, 2022

(30) Foreign Application Priority Data

Jun. 10, 2021 (JP) ................................ 2021-097318

(51) Int. Cl.
*B25D 16/00* (2006.01)
*B25D 17/04* (2006.01)

(52) U.S. Cl.
CPC ......... *B25D 16/006* (2013.01); *B25D 16/003* (2013.01); *B25D 17/043* (2013.01);
(Continued)

(58) Field of Classification Search
CPC .... B25D 16/00; B25D 16/003; B25D 16/006; B25D 17/00; B25D 17/043;
(Continued)

(56) References Cited

U.S. PATENT DOCUMENTS 3,485,966 A * 12/1969 Lutzenberger ....... H01H 15/005 200/16 R
3,629,526 A * 12/1971 Lewis .................. H01H 13/562 200/325

(Continued)

FOREIGN PATENT DOCUMENTS

DE 102015226091 * 6/2017
EP 3812097 A1 * 4/2012 ........... B25D 11/062

(Continued)

OTHER PUBLICATIONS

Jan. 21, 2025 Office Action issued in Japanese Patent Application No. 2021-097318.

*Primary Examiner* — Robert F Long
*Assistant Examiner* — Eduardo R Ferrero
(74) *Attorney, Agent, or Firm* — Oliff PLC

(57) ABSTRACT

A power tool having a rotary hammer mechanism has a motor, a driving mechanism, a tool body that houses the motor and the driving mechanism, a handle having a grip part, and a first operation member. The driving mechanism is configured to operate by power of the motor in an action mode that is selected from a plurality of operation modes including a first mode of at least rotationally driving a tool accessory around a driving axis and a second mode of only linearly driving the tool accessory along the driving axis. The grip part extends in a direction crossing the driving axis and is configured to be held by a user. The first operation member is on the tool body and faces the grip part. The first operation member is configured to be manually operated by the user to change the action mode of the driving mechanism.

14 Claims, 15 Drawing Sheets

(52) U.S. Cl.
CPC .............................. *B25D 2211/003* (2013.01); *B25D 2216/0023* (2013.01); *B25D 2250/121* (2013.01)

(58) Field of Classification Search
CPC ........ B25D 2211/003; B25D 2211/068; B25D 2216/0023; B25D 2216/0084; B25D 2216/0015; B25D 2216/0069; B25D 2250/121
See application file for complete search history.

(56) References Cited

U.S. PATENT DOCUMENTS 3,674,953 A * 7/1972 Brevick ................ H01H 23/02 200/16 D
3,845,826 A * 11/1974 Beisch ................ B25D 16/006 173/205
3,912,887 A * 10/1975 Gratz .................. H01H 15/005 200/16 D
3,947,391 A * 3/1976 Lutzenberger ....... H01H 15/005 200/16 D
4,016,378 A * 4/1977 Arthur .................. H01H 15/06 200/16 D
4,042,795 A * 8/1977 Sykora .................. H01H 15/08 200/275
4,204,580 A * 5/1980 Nalley ................ B25D 16/006 200/522
4,223,744 A * 9/1980 Lovingood ........... B25D 16/00 318/245
4,316,067 A * 2/1982 Whiteman, Jr. ..... H01H 15/005 200/16 R
4,438,301 A * 3/1984 Van Zeeland .......... H01H 19/60 200/16 D
4,441,000 A * 4/1984 Suwa .................... H01H 15/06 200/16 R
4,529,044 A * 7/1985 Klueber ................ B25D 16/00 408/9
4,529,851 A * 7/1985 Priebe .................. H01H 15/005 200/16 R
4,687,887 A * 8/1987 Stokoe ................ H01H 15/005 200/16 D
5,293,103 A * 3/1994 Hanna ................... H01H 15/06 318/268
5,842,527 A * 12/1998 Arakawa ............. B25D 16/006 173/104
6,035,945 A * 3/2000 Ichijyou ................ B25D 16/00 173/48
6,109,364 A * 8/2000 Demuth ............... B25D 16/006 173/48
6,192,996 B1 * 2/2001 Sakaguchi ........... B25D 16/006 173/48
6,550,545 B1 * 4/2003 Manschitz ........... B25D 16/006 173/217
6,868,919 B1 * 3/2005 Manschitz ........... B25D 16/006 335/205
6,971,455 B2 * 12/2005 Shibata ................ B25D 16/006 173/48
7,032,683 B2 * 4/2006 Hetcher ................ B25D 17/06 173/210
7,124,839 B2 * 10/2006 Furuta .................... B25B 21/00 173/104
7,208,692 B2 * 4/2007 Yamaguchi ............ H01H 15/06 200/549
7,306,048 B2 * 12/2007 Yamazaki ............ B25D 16/006 173/48
7,306,049 B2 * 12/2007 Soika .................. B25D 16/006 173/48
7,331,496 B2 * 2/2008 Britz .................... B25D 16/006 74/22 A
7,635,032 B2 * 12/2009 Saur .................... B25D 16/006 173/109
7,708,084 B2 * 5/2010 Duesselberg ........ B25D 16/006 173/217
7,806,199 B2 * 10/2010 Pohl ..................... B25D 16/006 173/171
7,931,095 B2 * 4/2011 Machida ............. B25D 11/062 173/104
8,028,760 B2 * 10/2011 Yoshikane ........... B25D 16/006 173/104
8,104,544 B2 * 1/2012 Ullrich .................... B25F 5/001 173/104
8,136,607 B2 * 3/2012 Frauhammer ......... B25B 23/141 173/180
8,636,081 B2 * 1/2014 Ludy .................... B25D 11/005 173/217
9,308,636 B2 * 4/2016 Wyler ...................... B25G 1/01
9,841,066 B2 * 12/2017 Yoshikane ........... B25D 16/003
9,999,967 B2 * 6/2018 Furusawa ............ B25D 17/043
10,807,224 B2 * 10/2020 Machida .............. B25D 16/003
11,052,525 B2 * 7/2021 Furusawa ............ B25D 11/062
2002/0003044 A1 * 1/2002 Funfer ................ B25D 16/006 173/48
2002/0134563 A1 * 9/2002 Stirm ..................... B25D 16/00 173/109
2004/0108123 A1 * 6/2004 Shibata ................ B25D 16/006 173/201
2004/0211574 A1 * 10/2004 Droste ................ B25D 16/006 173/29
2005/0173139 A1 * 8/2005 Furuta .................. B25D 16/006 173/48
2006/0011361 A1 * 1/2006 Shimma ................... H01H 9/06 173/48
2006/0032645 A1 * 2/2006 Shimma ............... B25D 16/006 173/48
2006/0090913 A1 * 5/2006 Furuta .................. B25D 16/003 173/48
2006/0108133 A1 * 5/2006 Yamazaki ............ B25D 11/125 173/104
2006/0124331 A1 * 6/2006 Stirm .................... F16D 43/208 173/178
2006/0137888 A1 * 6/2006 Soika .................. B25D 16/006 173/48
2006/0201688 A1 * 9/2006 Jenner ..................... B25B 23/14 173/48
2007/0074883 A1 * 4/2007 Strasser ............... B25D 16/006 173/104
2007/0125563 A1 * 6/2007 Furusawa ............ B25D 16/006 173/48
2008/0017396 A1 * 1/2008 Kristen ................ B25D 16/006 173/162.2
2008/0245542 A1 * 10/2008 Furusawa ............ B25D 16/006 173/201
2008/0271905 A1 * 11/2008 Yoshikane ........... B25D 16/006 173/109
2009/0126958 A1 * 5/2009 Trautner ............. B25D 16/006 173/104
2009/0223692 A1 * 9/2009 Yoshikane ............ B25D 16/00 173/133
2010/0000748 A1 * 1/2010 Machida ............. B25D 11/062 173/104
2010/0236800 A1 * 9/2010 Watanabe ............ B25D 17/043 173/162.2
2010/0236801 A1 * 9/2010 Furusawa ............. B25D 11/10 173/162.2
2010/0326685 A1 * 12/2010 Roehm .................. B25D 16/00 173/46
2012/0024555 A1 * 2/2012 Sugiyama ............. B25D 17/24 173/211
2012/0169256 A1 * 7/2012 Suda ....................... B25B 21/00 318/17
2012/0279740 A1 * 11/2012 Furusawa ............. B25D 17/24 173/79
2013/0153253 A1 * 6/2013 Ludy .................... B25D 11/005 173/133
2014/0027253 A1 * 1/2014 Braun .................... B25D 17/00 200/61.58 R

(56) References Cited

U.S. PATENT DOCUMENTS

| | | | | |
|---|---|---|---|---|
| 2014/0138111 | A1* | 5/2014 | Takeuchi | B25D 16/006 173/48 |
| 2014/0338944 | A1* | 11/2014 | Herr | B25D 17/06 173/104 |
| 2015/0372633 | A1* | 12/2015 | Machida | B25D 16/00 173/48 |
| 2016/0207187 | A1* | 7/2016 | Nishikawa | B25D 16/00 |
| 2017/0106517 | A1* | 4/2017 | Machida | B25D 16/00 |
| 2017/0129091 | A1* | 5/2017 | Schiegel | B25F 5/00 |
| 2017/0246736 | A1* | 8/2017 | Kikuchi | B25D 11/04 |
| 2017/0252915 | A1* | 9/2017 | Furusawa | B25D 11/062 |
| 2017/0274517 | A1* | 9/2017 | Mascall | B25D 11/005 |
| 2017/0320205 | A1* | 11/2017 | Schaer | B25F 5/001 |
| 2018/0099391 | A1* | 4/2018 | Umemoto | B25D 16/00 |
| 2018/0099395 | A1 | 4/2018 | Iida et al. | |
| 2018/0099399 | A1* | 4/2018 | Sunabe | B25F 5/02 |
| 2018/0199794 | A1* | 7/2018 | Nemetz | B25D 16/00 |
| 2019/0070721 | A1* | 3/2019 | Kawano | B25F 5/00 |
| 2019/0118361 | A1* | 4/2019 | Takeuchi | B25D 16/006 |
| 2020/0078919 | A1 | 3/2020 | Machida et al. | |
| 2021/0039240 | A1 | 2/2021 | Iida | |
| 2021/0394344 | A1* | 12/2021 | Mueckl | B25B 21/023 |
| 2022/0297279 | A1* | 9/2022 | Abbott | B25F 5/00 |

FOREIGN PATENT DOCUMENTS

| | | | | |
|---|---|---|---|---|
| JP | 2004-330379 | A | 11/2004 | |
| JP | 2011-131364 | A | 7/2011 | |
| JP | 2018-058183 | A | 4/2018 | |
| JP | 2020-040199 | A | 3/2020 | |
| JP | 6778071 | B2 | 10/2020 | |
| JP | 2021-024051 | A | 2/2021 | |
| WO | WO-2017102513 | A1 * | 6/2017 | B25D 11/102 |

* cited by examiner

POWER TOOL HAVING ROTARY HAMMER MECHANISM

CROSS REFERENCE TO RELATED ART

The present application claims priority to Japanese Patent Application No. 2021-9718 filed on Jun. 10, 2021, the disclosure of which is hereby incorporated by reference in its entirety.

TECHNICAL FIELD

The present disclosure relates to a power tool having a rotary hammer mechanism.

BACKGROUND

Power tools having a rotary hammer mechanism are known. Such power tools are configured to operate according to a mode selected from a plurality of modes, including a mode of performing only hammering motion of linearly driving a tool accessory in a direction along a prescribed driving axis and a mode of performing at least rotating motion of rotationally driving the tool accessory around the driving axis. Japanese Patent No. 6778071 discloses a rotary hammer having a mode change dial for changing an action mode.

In the rotary hammer disclosed in JP6778071, the mode change dial is arranged in an upper end portion of a housing that houses a driving mechanism. In this rotary hammer, however, the mode change dial may be damaged, for example, if the rotary hammer drops with the upper end portion of the housing facing vertically downward. Therefore, a technique for reducing the possibility of damage to an operation part for mode selection has been desired in a power tool having a rotary hammer mechanism that is configured to operate according to a selected mode.

SUMMARY

According to one aspect of the present disclosure, a power tool having a rotary hammer mechanism is provided. The power tool has a motor, a driving mechanism, a tool body, a handle and a first operation member. The driving mechanism is configured to operate by power of the motor in an action mode that is selected from a plurality of action modes including a first mode of at least rotationally driving a tool accessory around a driving axis and a second mode of only linearly driving the tool accessory along the driving axis. The tool body is configured to house the motor and the driving mechanism. The handle has a grip part that extends in a direction crossing the driving axis and is configured to be held by a user. The first operation member is on the tool body and faces the grip part. The first operation member is configured to be manually operated by the user to change the action mode of the driving mechanism.

According to this aspect, the first operation member for changing the mode of the driving mechanism is on the tool body and faces the grip part, so that the first operation member is prevented from colliding with a wall or the ground or the like, for example, even if the power tool collides therewith. Thus, the possibility of damage to the first operation member due to external impact on the power tool is reduced.

DETAILED DESCRIPTION OF THE EMBODIMENTS

Figure 1:
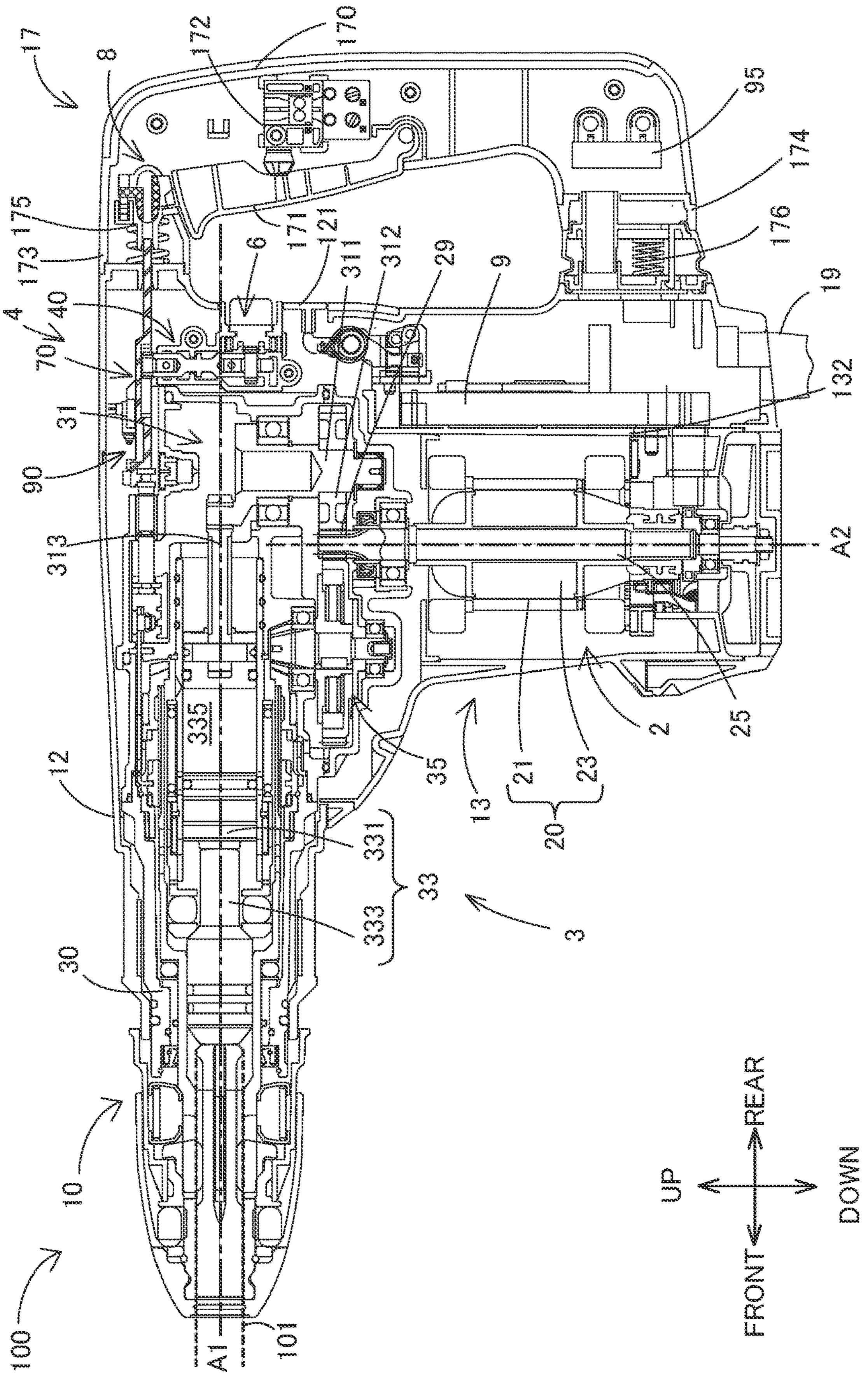
FIG. 1 is a longitudinal section schematically showing a rotary hammer.

In one non-limiting embodiment according to the present disclosure, the grip part may include a second operation member. The second operation member may be configured to be normally held in an OFF position and to be moved to an ON position to drive the motor when manually depressed by the user. The first operation member may be arranged in a position facing the second operation member.

According to this embodiment, the user can operate the first operation member and the second operation member with the same hand. Thus, the maneuverability of the power tool can be improved.

In addition or in the alternative to the preceding embodiments, the first operation member may be configured to be slidable within a predetermined range in a direction crossing the driving axis. The first operation member may be configured to change the action mode of the driving mechanism to the first mode when moved to a first position within the predetermined range, and to change the action mode to the second mode when moved to a second position different from the first position within the predetermined range.

According to this embodiment, the action mode of the driving mechanism can be changed to the first mode or to the second mode in response to the operation of the first operation member.

In addition or in the alternative to the preceding embodiments, the power tool may further have a tool holder and a clutch member. The tool holder may be configured to removably hold the tool accessory and to be rotationally driven around the driving axis by torque transmitted from the motor. The clutch member may be on the tool holder. The clutch member may be configured to be movable along the driving axis in response to the operation of the first operation member. The clutch member may be configured to transmit the torque when the he clutch member is in a third position in a direction along the driving axis and to interrupt the torque transmission when the clutch member is in a fourth position different from the third position in the direction along the driving axis. The driving mechanism may be configured to operate in the first mode when the clutch member is in the third position, and to operate in the second mode when the clutch member is in the fourth position.

According to this embodiment, the action mode of the driving mechanism can be changed to the first mode or to the second mode in response to movement of the clutch member the third position or the fourth position in the direction along the driving axis.

In addition or in the alternative to the preceding embodiments, the power tool may further have a transmitting mechanism. The transmitting mechanism may be configured to transmit sliding movement of the first operation member within the predetermined range to the clutch member and move the clutch member along the driving axis.

According to this embodiment, the sliding movement of the first operation member can be transmitted to the clutch member that is provided on the tool holder configured to be rotationally driven around the driving axis.

In addition or in the alternative to the preceding embodiments, the transmitting mechanism may include a converting mechanism. The converting mechanism may be configured to convert linear sliding movement of the first operation member within the predetermined range into rotating motion and further convert the rotating motion into linear motion along the driving axis.

According to this embodiment, the transmitting mechanism can move the clutch member along the driving axis by converting the linear sliding movement of the first operation member into rotating motion and converting the rotating motion into linear motion along (parallel to) the driving axis. Further, the degree of freedom in arrangement of the transmitting mechanism is enhanced as compared with a structure not having the converting mechanism.

In addition or in the alternative to the preceding embodiments, the converting mechanism may include a first rack gear, a first pinion gear, a second pinion gear and a second rack gear. The first rack gear may be configured to slide in response to the linear sliding movement of the first operation member within the predetermined range. The first pinion gear may be configured to be engaged with the first rack gear. The second pinion gear may be configured to rotate in response to rotation of the first pinion gear. The second rack gear may be configured to be engaged with the second pinion gear and convert the rotating motion of the first pinion gear and the second pinion gear into the linear motion along the driving axis.

According to this embodiment, the linear sliding movement of the first operation member can be converted into linear motion and then transmitted to the clutch member by using the first rack gear and the first pinion gear, and the second pinion gear and the second rack gear.

In addition or in the alternative to the preceding embodiments, the power tool may have a biasing member that is configured to bias the first operation member. The first operation member may be configured to be held in the first position or the second position by biasing force of the biasing member.

According to this embodiment, the power tool can be provided that facilitates sliding the first operation member within the predetermined range and positioning it in the first position or the second position.

In addition or in the alternative to the preceding embodiments, the grip part may include a second operation member that is configured to be normally held in an OFF position and to be moved to an ON position to drive the motor when manually depressed by the user. The power tool may further have a locking member and a lock controlling member. The locking member may be configured to be moved to a lock position to lock the second operation member in the ON position or to a non-lock position not to lock the second operation member in the ON position, in response to the user's manual operation of the locking member. The lock controlling member may be configured to be movable along the driving axis. The lock controlling member may be configured to, when the first mode is selected in response to the user's operation of the first operation member, the lock control member is in a position to interfere with the locking member, thereby holding the locking member in the non-lock position. Further, the lock controlling member may be configured to, when the second mode is selected in response to the user's operation of the first operation member, the lock control member is in a position not to interfere with the locking member, thereby allowing the locking member to move to the lock position.

According to this embodiment, the user need not continue manually depressing the second operation member during operation of continuously performing hammering only motion for a relatively long time. Thus, the burden on the user during the operation can be reduced. Further, the lock controlling member is configured to hold the locking member in the non-lock position, in the first mode in which the tool accessory performs (produces, provides) rotating motion. Thus, the user can stop driving of the motor simply by releasing the second operation member, for example, even if the tool accessory is jammed on the workpiece. Therefore, the power tool is provided with high safety.

In addition or in the alternative to the preceding embodiments, the power tool may further have a mode detecting part, a rotation detecting part and a controlling part. The mode detecting part may be configured to at least detect that the action mode of the driving mechanism is the first mode. The rotation detecting part may be configured to detect the state of rotation of the tool body around the driving axis. The controlling part may be configured to control driving of the motor. The controlling part may be configured to stop driving of the motor when detecting that the action mode is the first mode and detecting excessive rotation of the tool body around the driving axis, based on detection results of the mode detecting part and the rotation detecting part.

According to this embodiment, in the first mode in which the tool accessory performs rotating motion, the controlling part stops driving of the motor based on the detection results of the rotation detecting part, for example, even if the tool accessory is jammed (locked) on the workpiece and the tool body excessively rotates around the driving axis (this phenomenon is also referred to as kickback). Therefore, the safety of the power tool can be further enhanced.

In addition or in the alternative to the preceding embodiments, the power tool may further have an elastic member. The elastic member may connect the handle to the tool body so as to be movable along the driving axis relative to the tool body. The rotation detecting part may be housed within the handle.

According to this embodiment, transmission of vibration from the tool body to the rotation detecting part is reduced. Thus, the life of the rotation detecting part can be prolonged.

A power tool having a rotary hammer mechanism according to one embodiment of the present disclosure is now described with reference to FIGS. 1 to 15. In this embodiment, a rotary hammer 100 is described as a representative example of the power tool. The rotary hammer 100 is configured to rotationally drive a tool accessory 101 coupled to a tool holder 30 around a prescribed driving axis A1 (such motion is hereinafter referred to as rotating motion) and to linearly drive the tool accessory 101 in parallel to the driving axis A1 (such motion is hereinafter referred to as hammering motion).

First, the structure of the rotary hammer (also called a hammer drill) 100 as a whole is described in brief with reference to FIG. 1. The rotary hammer 100 includes a tool body 10 and a handle 17 connected to the tool body 10.

The tool body 10 includes a gear housing 12 extending along the driving axis A1 (the driving axis A1 direction), and a motor housing 13 connected to one end portion in a longitudinal direction of the gear housing 12 and extending in a direction crossing the driving axis A1. In this embodiment, the motor housing 13 extends in a direction substantially orthogonal to the driving axis A1. Thus, the tool body 10 is generally L-shaped as a whole.

A tool holder 30 is provided within the other end portion of the gear housing 12 in the longitudinal direction and configured to removably hold the tool accessory 101. A driving mechanism 3 is housed within the gear housing 12. The driving mechanism 3 is configured to operate in an action mode that is selected from a plurality of action modes including a mode of performing rotating motion and hammering motion (such mode is hereinafter referred to as rotary hammer mode (hammering with rotation mode)) and a mode of performing hammering only motion (such mode is hereinafter referred to as hammer mode), which will be described in detail below. A motor 2 is housed within the motor housing 13. The motor 2 is arranged such that a rotational axis A2 of a motor shaft 25 crosses (more specifically, extend orthogonally to) the driving axis A1. The gear housing 12 and the motor housing 13 are connected together so as to be immovable relative to each other.

The handle 17 includes a grip part 170 extending in a direction crossing (more specifically, orthogonal to) the driving axis A1 (driving axis A1 direction), and connection parts 173, 174 protruding from both end portions in a longitudinal direction of the grip part 170 in a direction crossing (more specifically, orthogonal to) the grip part 170. The handle 17 is generally C-shaped as a whole. The handle 17 is connected to an end portion of the tool body 10 on the side opposite from the tool holder 30 in the longitudinal direction of the tool body 10. More specifically, the connection part 173 is connected to the gear housing 12, and the connection part 174 is connected to the motor housing 13.

The structure of the rotary hammer 100 is now described in detail. In the following description, for convenience sake, the extending direction of the driving axis A1 of the rotary hammer 100 (the longitudinal direction of the gear housing 12) is defined as a front-rear direction of the rotary hammer 100. In the front-rear direction, the side of one end portion of the rotary hammer 100 in which the tool holder 30 is provided is defined as the front of the rotary hammer 100, and the opposite side is defined as the rear of the rotary hammer 100. The extending direction of the grip part 170 is defined as an up-down direction of the rotary hammer 100. In the up-down direction, the side of the rotary hammer 100 where the connection part 173 is connected to the gear housing 12 is defined as an upper side, and the opposite side is defined as a lower side. A direction orthogonal to the front-rear direction and the up-down direction is defined as a left-right direction.

First, the handle 17 is described. As described above, the handle 17 includes the grip part 170 extending in the up-down direction, the connection part 173 protruding forward from an upper end of the grip part 170, and the connection part 174 protruding forward from a lower end of the grip part 170. As shown in FIG. 1, elastic members 175 and 176 are respectively arranged between the connection part 173 and a rear upper end portion of the gear housing 12 and between the connection part 174 and a rear lower end portion of the motor housing 13. In this embodiment, compression coil springs are adopted as the elastic members 175, 176. The handle 17 is connected to be movable in the front-rear direction relative to the tool body 10 via the elastic members 175, 176. This structure reduces transmission of vibration (particularly, vibration caused in the front-rear direction by the hammering motion) from the tool body 10 to the handle 17.

Figure 2:
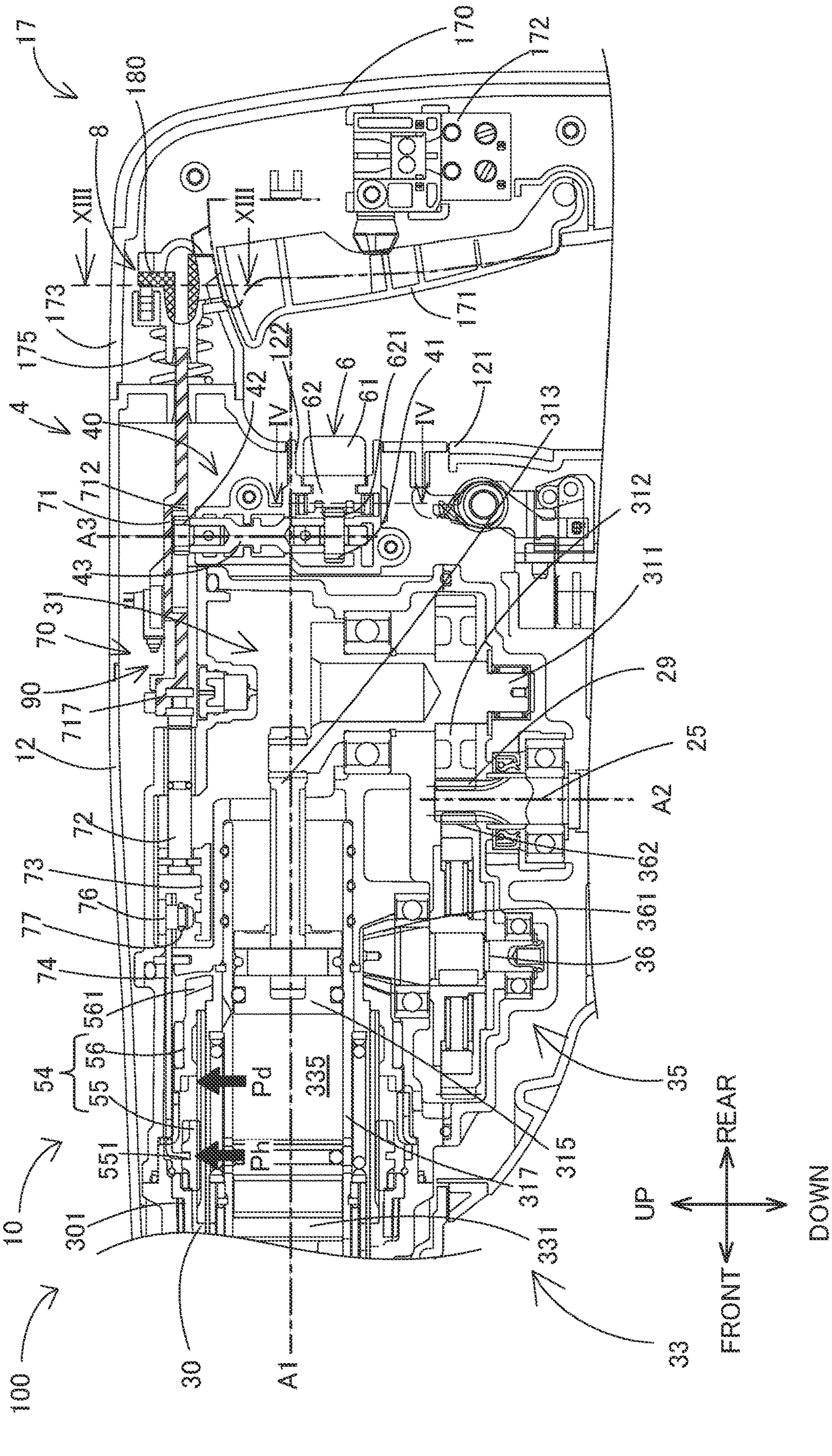
FIG. 2 is a partial, enlarged view of FIG. 1 in a hammer mode.

A switch lever 171 is provided in the grip part 170. The switch lever 171 is arranged extending upward from a substantially intermediate portion of the grip part 170 in the up-down direction on the front side of the grip part 170. The switch lever 171 is configured to be manually depressed by a user. In FIG. 2, OFF and ON positions of the switch lever 171 are shown by a solid line and a two-dot chain line, respectively. The switch lever 171 is normally held in the OFF position by being biased forward by a plunger of a main switch 172 disposed behind the switch lever 171, and when manually depressed by the user, the switch lever 171 is retracted rearward to the ON position within the grip part 170. When the switch lever 171 is moved to the ON position, the main switch 172 housed within the handle 17 is turned on, and the motor 2 is driven by control of a controller 9 described below.

A locking mechanism 8 is provided in the vicinity of the connection part 173 of the handle 17. The locking mechanism 8 is configured to lock the switch lever 171 in the ON position when the action mode is the hammer mode and not to lock the switch lever 171 in the ON position when the action mode is the rotary hammer mode. The locking mechanism 8 will be described below in further detail.

An acceleration sensor 95 is housed within the handle 17. In this embodiment, the acceleration sensor 95 is housed within a lower end portion of the grip part 170 and arranged relatively apart from the driving axis A1. The acceleration sensor 95 is configured to output signals indicating detected acceleration to the controller 9 described below. In this embodiment, the acceleration detected by the acceleration sensor 95 is used as an index that indicates the state of rotation of the tool body 10 around the driving axis A1.

The structures of elements disposed within the motor housing 13 are now described. The motor housing 13 mainly houses the motor 2 and the controller 9.

As shown in FIG. 1, the motor 2 has a motor body 20 including a stator 21 and a rotor 23, and a motor shaft 25 extending from the rotor 23. The rotational axis A2 of the motor 2 (the motor shaft 25) extends in the up-down direction. In this embodiment, an AC motor is adopted as the motor 2 and is driven by power supply from an external power source via a power cord 19. The motor shaft 25 is rotatably supported at its upper and lower end portions by bearings. The upper end portion of the motor shaft 25 protrudes into the gear housing 12 and has a driving gear 29.

The controller 9 is mounted to a rear wall 132 of the motor body 20. In this embodiment, the controller 9 is formed by a microcomputer including a CPU and memories and configured such that the CPU controls operation of the rotary hammer 100.

The controller 9 is electrically connected to the main switch 172, the acceleration sensor 95 and a mode detecting part 90 described below via electric wires (not shown). In this embodiment, when the main switch 172 is turned on, the controller 9 drives the motor 2 according to the rotation speed set via an adjusting dial (not shown). Further, the controller 9 is configured to stop driving of the motor 2 when detecting excessive rotation of the tool body 10 around the driving axis A1 based on the detection results of the acceleration sensor 95 and the mode detecting part 90, which will be described in detail below.

The structures of elements disposed within the gear housing 12 are now described. The gear housing 12 mainly houses the tool holder 30, the driving mechanism 3 and a transmitting mechanism 4.

The gear housing 12 has a generally cylindrical front portion extending parallel to the driving axis A1. The tool holder 30 is housed in this cylindrical portion (also referred to as a barrel part). Although not shown, an auxiliary handle for assisting in holding the rotary hammer 100 can be attached to the barrel part.

The driving mechanism 3 includes a motion converting mechanism 31, a striking mechanism 33 and a rotation transmitting mechanism 35. Most of the motion converting mechanism 31 and the rotation transmitting mechanism 35 are housed in a rear portion of the gear housing 12.

The motion converting mechanism 31 is configured to convert rotation of the motor 2 into linear motion and transmit it to the striking mechanism 33. In this embodiment, a known crank mechanism is adopted as the motion converting mechanism 31. As shown in FIG. 2, the motion converting mechanism 31 includes a crank shaft 311, a connecting rod 313 and a piston 315. The crank shaft 311 is arranged in parallel to the motor shaft 25 in a rear end portion of the gear housing 12. The crank shaft 311 has a driven gear 312 engaged with a driving gear 29. One end portion of the connecting rod 313 is connected to an eccentric pin, and the other end portion of the connecting rod 313 is connected to the piston 315 via a connection pin. The piston 315 is slidably disposed within a tubular cylinder 317. When the motor 2 is driven, the piston 315 is reciprocated along (parallel to) the driving axis A1 (in the front-rear direction) within the cylinder 317.

The striking mechanism 33 includes a striker 331 and an impact bolt 333 (see FIG. 1). The striker 331 is disposed in front of the piston 315 so as to be slidable in the front-rear direction within the cylinder 317. An air chamber 335 is formed between the striker 331 and the piston 315 and serves to linearly move the striker 331 via air pressure fluctuations caused by reciprocating movement of the piston 315. The impact bolt 333 is configured to transmit kinetic energy of the striker 331 to the tool accessory 101. As shown in FIG. 1, the impact bolt 333 is arranged to be slidable in the front-rear direction within the tool holder 30 that is coaxially arranged with the cylinder 317.

When the motor 2 is driven and the piston 315 is moved forward, air in the air chamber 335 is compressed and its internal pressure increases. The striker 331 is pushed forward at high speed by action of the air spring and collides with the impact bolt 333, thereby transmitting its kinetic energy to the tool accessory 101. As a result, the tool accessory 101 is linearly driven in parallel to the driving axis A1 and strikes a workpiece. On the other hand, when the piston 315 is moved rearward, air of the air chamber 335 expands so that the internal pressure decreases and the striker 331 is retracted rearward. The rotary hammer 100 produces (provides) hammering motion by causing the motion converting mechanism 31 and the striking mechanism 33 to repeat these operations.

The rotation transmitting mechanism 35 is configured to transmit torque of the motor shaft 25 to the tool holder 30. In this embodiment, as shown in FIG. 2, the rotation transmitting mechanism 35 includes the driving gear 29 formed on the motor shaft 25, an intermediate shaft 36 and a clutch mechanism 54. The rotation transmitting mechanism 35 is configured as a reduction gear mechanism, and the rotation speeds of the motor shaft 25, the intermediate shaft 36 and the tool holder 30 are reduced in this order.

The intermediate shaft 36 is arranged in front of and above the motor 2 in parallel to the motor shaft 25. A driven gear 362 is provided on a lower portion of the intermediate shaft 36 and engaged with the driving gear 29. A small bevel gear 361 is provided on an upper end portion of the intermediate shaft 36.

The clutch mechanism 54 is on the tool holder 30. The clutch mechanism 54 is configured to transmit torque from the motor shaft 25 to the tool holder 30 or to interrupt the torque transmission. In this embodiment, the clutch mechanism 54 includes a gear sleeve 56 having a large bevel gear 561, and a driving sleeve 55. The gear sleeve 56 is supported around a rear end portion of the tool holder 30 so as to be rotatable around the driving axis A1. The large bevel gear 561 is engaged with the small bevel gear 361 provided on the upper end portion of the intermediate shaft 36.

The driving sleeve 55 has a tubular shape and is spline-connected to an outer periphery of the tool holder 30 in front of the gear sleeve 56. Thus, the driving sleeve 55 is engaged with the tool holder 30 so as to be restrained from moving in a circumferential direction relative to the tool holder 30 while being movable in the front-rear direction.

Figure 8:
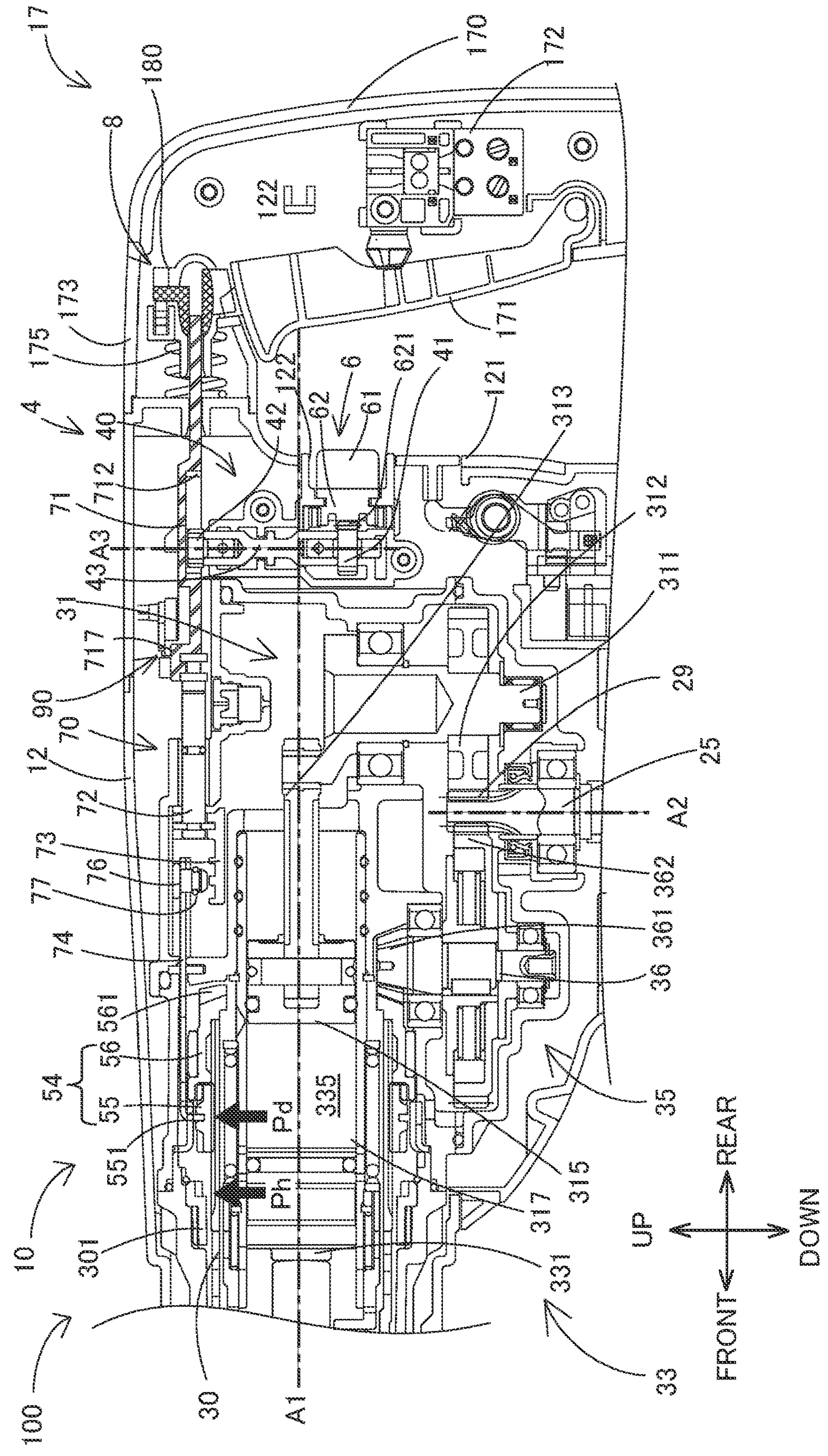
FIG. 8 is a partial, enlarged view corresponding to FIG. 2, showing the rotary hammer in the rotary hammer mode.
Figure 11:
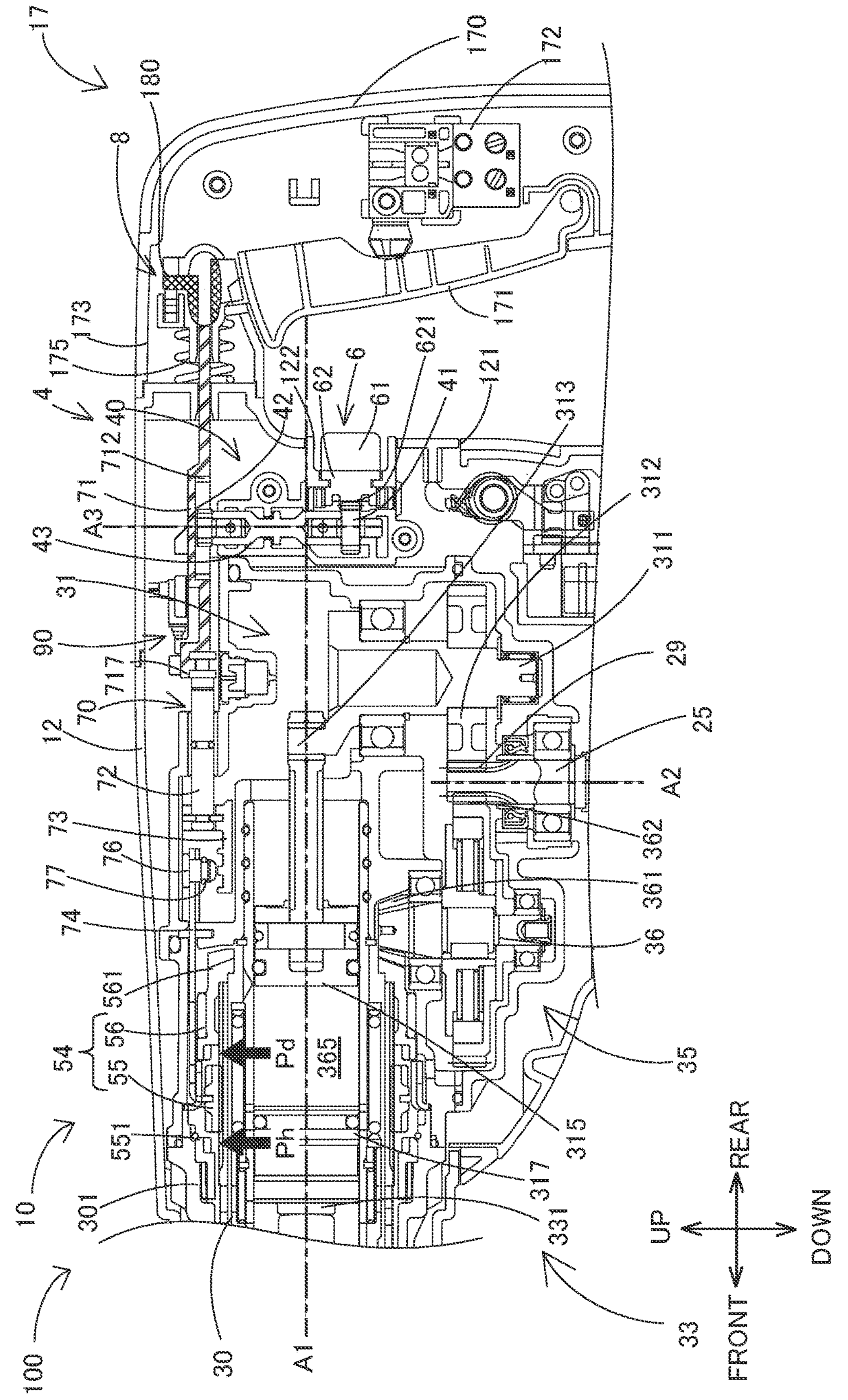
FIG. 11 is a partial, enlarged view corresponding to FIG. 2, showing the rotary hammer in the neutral mode.

A rearmost position (hereinafter referred to as a position Pd) and a foremost position (hereinafter referred to as a position Ph) within a moving range of the driving sleeve 55 are shown in FIGS. 2, 8 and 11. The driving sleeve 55 is engaged with a front end portion of the gear sleeve 56 when moved to the position Pd (see FIG. 8). In this state, torque of the motor 2 can be transmitted to the tool holder 30 via the rotation transmitting mechanism 35. When the motor 2 is driven, the motion converting mechanism 31 is also driven as described above. Therefore, when the motor 2 is driven while the driving sleeve 55 is in the position Pd, rotating motion and hammering motion are simultaneously performed in the rotary hammer 100. Thus, when the driving sleeve 55 is moved to the position Pd, the action mode of the rotary hammer 100 is changed (set) to the rotary hammer mode.

The driving sleeve 55 is disengaged from the gear sleeve 56 when moved forward from the position Pd (see FIG. 11). Thus, torque of the motor 2 cannot be transmitted to the tool holder 30 via the rotation transmitting mechanism 35. When moved to the position Ph, as shown in FIG. 2, the driving sleeve 55 is engaged with a lock ring 301 fixed to the gear housing 12, so that the tool holder 30 cannot rotate around the driving axis A1. In this state, when the motor 2 is driven, the motion converting mechanism 31 is driven, and hammering only motion is performed in the rotary hammer 100. Thus, when the driving sleeve 55 is moved to the position Ph, the action mode of the rotary hammer 100 is changed (set) to the hammer mode. In this manner, in the rotary hammer 100, the action mode is changed by the driving sleeve 55 being moved in parallel to the driving axis A1 (in the front-rear direction).

When the driving sleeve 55 is moved to a position between the position Ph and the position Pd as shown in FIG. 11, torque of the motor 2 cannot be transmitted to the tool holder 30 as described above. Further, the driving sleeve 55 is not engaged with the lock ring 301, so that the tool holder 30 is not fixed to the gear housing 12. Therefore, in this state, a user can hold and turn the tool accessory 101 around the driving axis A1 with fingers together with the tool holder 30. Thus, the action mode of the rotary hammer 100 is changed (set) to a mode in which a user is allowed to position the tool accessory 101 on a workpiece. This action mode is also referred to as a "neutral mode".

A structure for changing the action mode of the rotary hammer 100 is now described. The rotary hammer 100 has a mode changing operation part 6 to be manually operated (manipulated) by a user and the transmitting mechanism 4 configured to transmit the user's manual operation (manipulation) of the mode changing operation part 6 to the driving sleeve 55, and is configured to change the action mode via these parts.

As shown in FIGS. 1, 2, 8 and 11, the mode changing operation part 6 is on the tool body and faces the grip part 170. The mode changing operation part 6 faces the switch lever 171 provided on the front side of the grip part 170. In this embodiment, the mode changing operation part 6 is supported by the gear housing 12 so as to be linearly movable in the left-right direction while being partly exposed through an opening 122 formed in an upper portion of a rear wall 121 of the gear housing 12. The mode changing operation part 6 is also referred to as a mode change lever.

Figure 3:
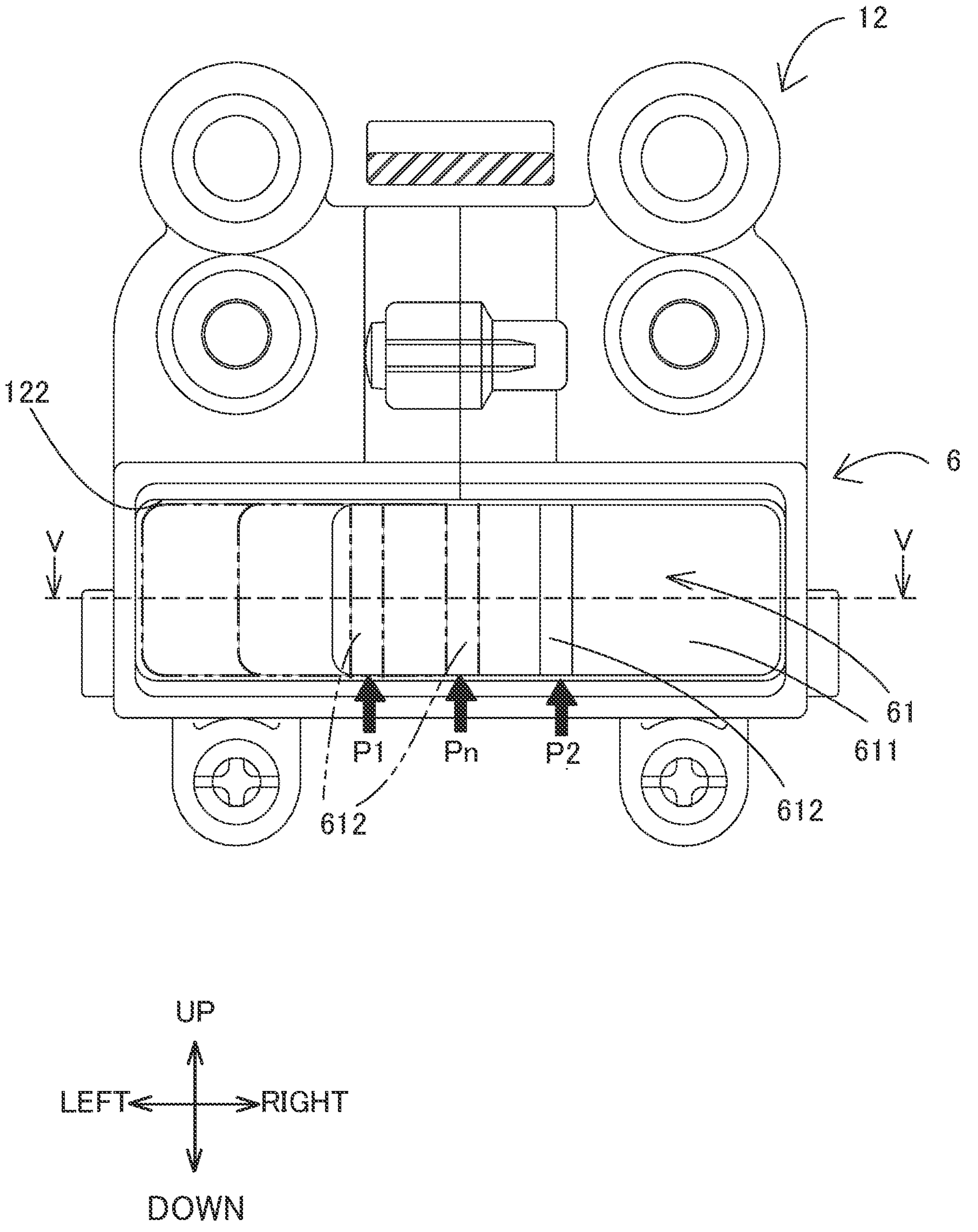
FIG. 3 shows a mode change operation part as viewed from the rear.

The mode changing operation part 6 has a main operation part 61 to be manually operated by a user, and a base 62 connected to the main operation part 61. As shown in FIG. 3, the main operation part 61 has a rectangular plate part 611 having a long axis in the left-right direction, and a lever 612 protruding rearward from the plate part 611. The lever 612 is formed on a central part of the plate part 611 in the left-right direction and extends in the up-down direction. The mode changing operation part 6 is movable between a position P1 and a position P2 that are respectively located to the left and right of a position Pn where the lever 612 is located at the center of the opening 122 in the left-right direction. In FIG. 3, the mode changing operation part 6 located in the position P2 is shown in solid lines, and the mode changing operation part 6 located in the position Pn or P1 is shown in two-dot chain lines. A user manually operates the lever 612 to move the mode changing operation part 6 to the position P2 in order to change the action mode into the hammer mode, or to the position P1 in order to change the action mode into the rotary hammer mode, or to the position Pn in order to change the action mode into the neutral mode, which will be described in detail below.

Figure 4:
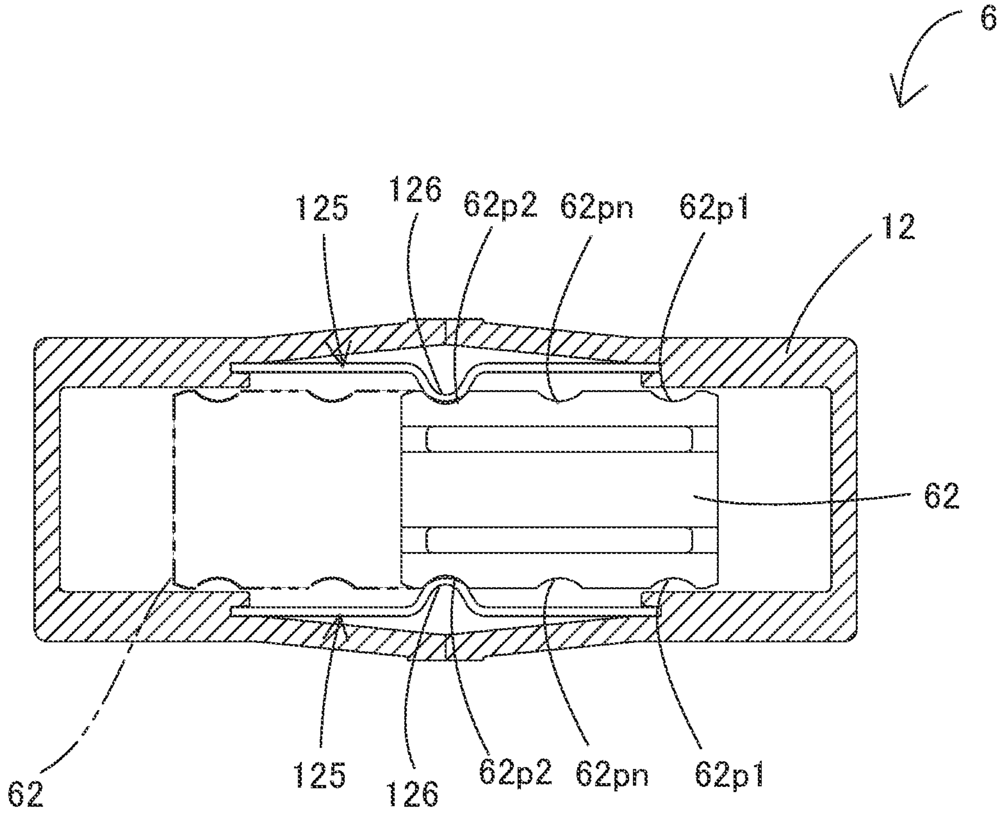
FIG. 4 is a sectional view taken along line IV-IV in FIG. 2, for illustrating how the mode change operation part is positioned by leaf springs.
Figure 4:
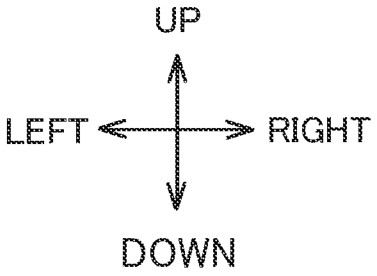

The base 62 of the mode changing operation part 6 is held by the gear housing 12 so as to be movable in the left-right direction. As shown in FIG. 4, leaf springs 125 are arranged on upper and lower sides of the base 62 and held by the gear housing 12. Each of the leaf springs 125 extends in the left-right direction in sectional view. The leaf spring 125 has a projection 126 protruding toward the base 62 at a position corresponding to the center of the opening 122 in the left-right direction. The base 62 has an upper end having recesses 62*p*2, 62*pn*, 62*p*1 recessed downward and a lower end having recesses 62*p*2, 62*pn*, 62*p*1 recessed upward. The recesses 62*p*2, 62*pn*, 62*p*1 are arranged in this order from left to right and configured to be engaged with the projection 126 of the leaf spring 125. In FIG. 4, the projection 126 is engaged with the recess 62*p*2. The recesses 62*p*2, 62*pn*, 62*p*1 are spaced apart from each other in the left-right direction so as to position the mode changing operation part 6 in the positions P2, Pn, P1, respectively, when engaged with the projection 126. In this manner, the mode changing operation part 6 is held in the position P2, Pn or P1 by biasing force of the leaf springs 125.

The transmitting mechanism 4 is now described. The transmitting mechanism 4 is configured to transmit the user's manual operation of the mode changing operation part 6 to the driving sleeve 55. In this embodiment, as shown in FIG. 2, the transmitting mechanism 4 has a first converting mechanism 40, and a connecting member 70 that connects the first converting mechanism 40 and the driving sleeve 55. The first converting mechanism 40 is configured to convert linear sliding movement of the mode changing operation part 6 (the main operation part 61) in the left-right direction into linear motion in a direction parallel to the driving axis A1 (the front-rear direction). The connecting member 70 is arranged to be movable in parallel to the driving axis A1 and configured to connect the first converting mechanism 40 and the driving sleeve 55.

The first converting mechanism 40 is described now. The first converting mechanism 40 is configured as a rack and pinion mechanism. As shown in FIGS. 2, 8 and 11, the first converting mechanism 40 includes a first rack gear 621, a first pinion gear 41, a first shaft 43, a second pinion gear 42 and a second rack gear 712. In this embodiment, these components of the first converting mechanism 40 are configured to move the connecting member 70 to a rearmost position within a moving range of the connecting member 70 when the mode changing operation part 6 is moved to the position P1 and to move the connecting member 70 to a foremost position within the moving range when the mode changing operation part 6 is moved to the position P2. These components are now described below.

Figure 5:
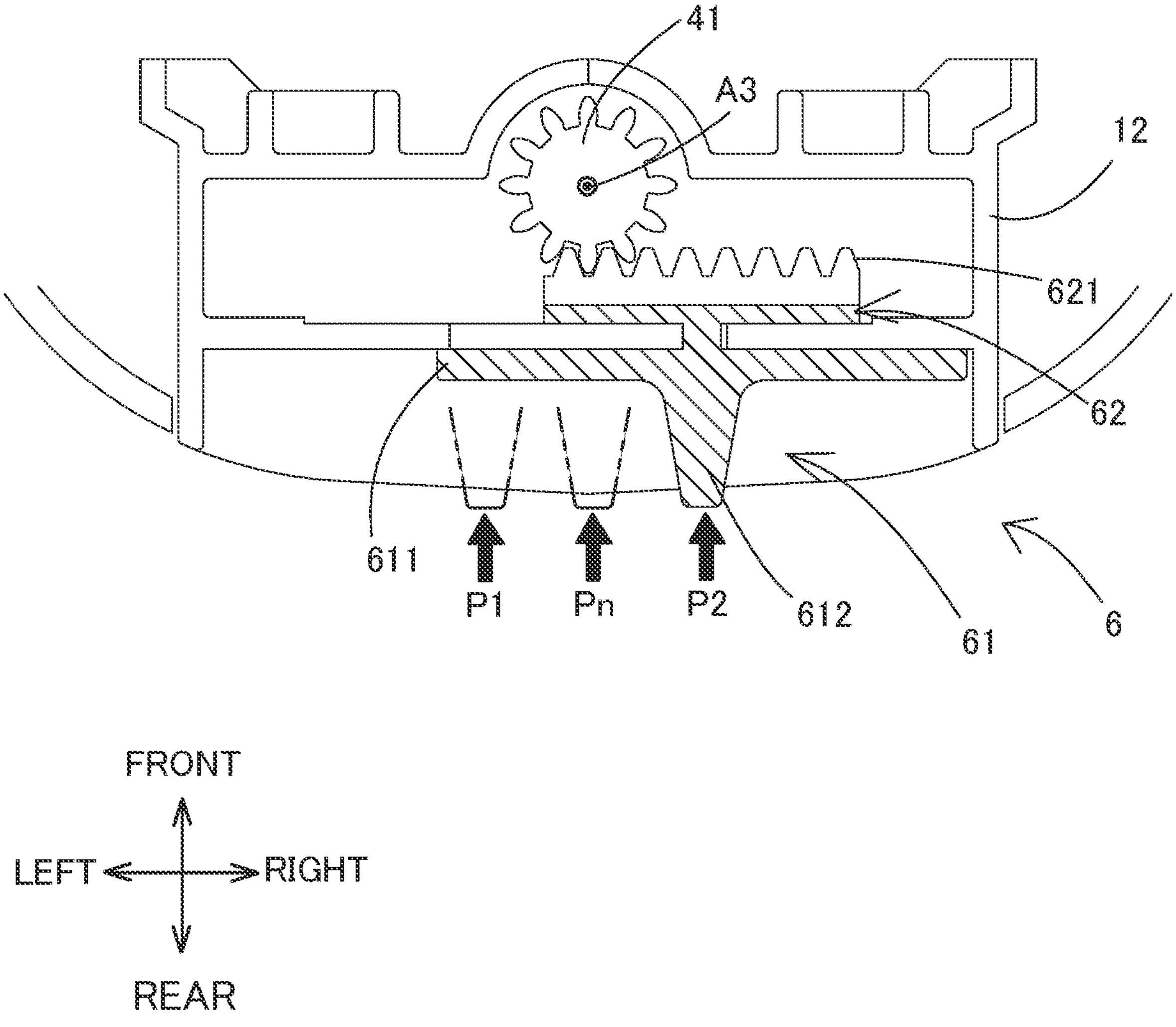
FIG. 5 is a sectional view taken along line V-V in FIG. 3, for illustrating the relation between a first rack gear of the mode change operation part and a first pinion gear.

The first rack gear 621 is a part of the mode changing operation part 6. As shown in FIG. 5, the first rack gear 621 is on a front portion of the base 62. The first rack gear 621 linearly moves in the left-right direction along with linear movement of the mode changing operation part 6 (the main operation part 61) in the left-right direction.

The first pinion gear 41 is engaged with the first rack gear 621 on the front side of the first rack gear 621. As shown in FIGS. 2, 8 and 11, the first shaft 43 extends in the up-down direction and is rotatably supported by the gear housing 12. The first pinion gear 41 is fixed to a lower portion of the first shaft 43. The second pinion gear 42 is fixed to an upper portion of the first shaft 43. A central axis of the first shaft 43 is coincident with a rotational axis of the first and second pinion gears 41, 42 (hereinafter referred to as a rotational axis A3). When the first rack gear 621 moves in the left-right direction, the first pinion gear 41 rotates around the rotational axis A3 and rotates the first shaft 43. Thus, the second pinion gear 42 held on the upper portion of the first shaft 43 rotates around the rotational axis A3.

Figure 6:
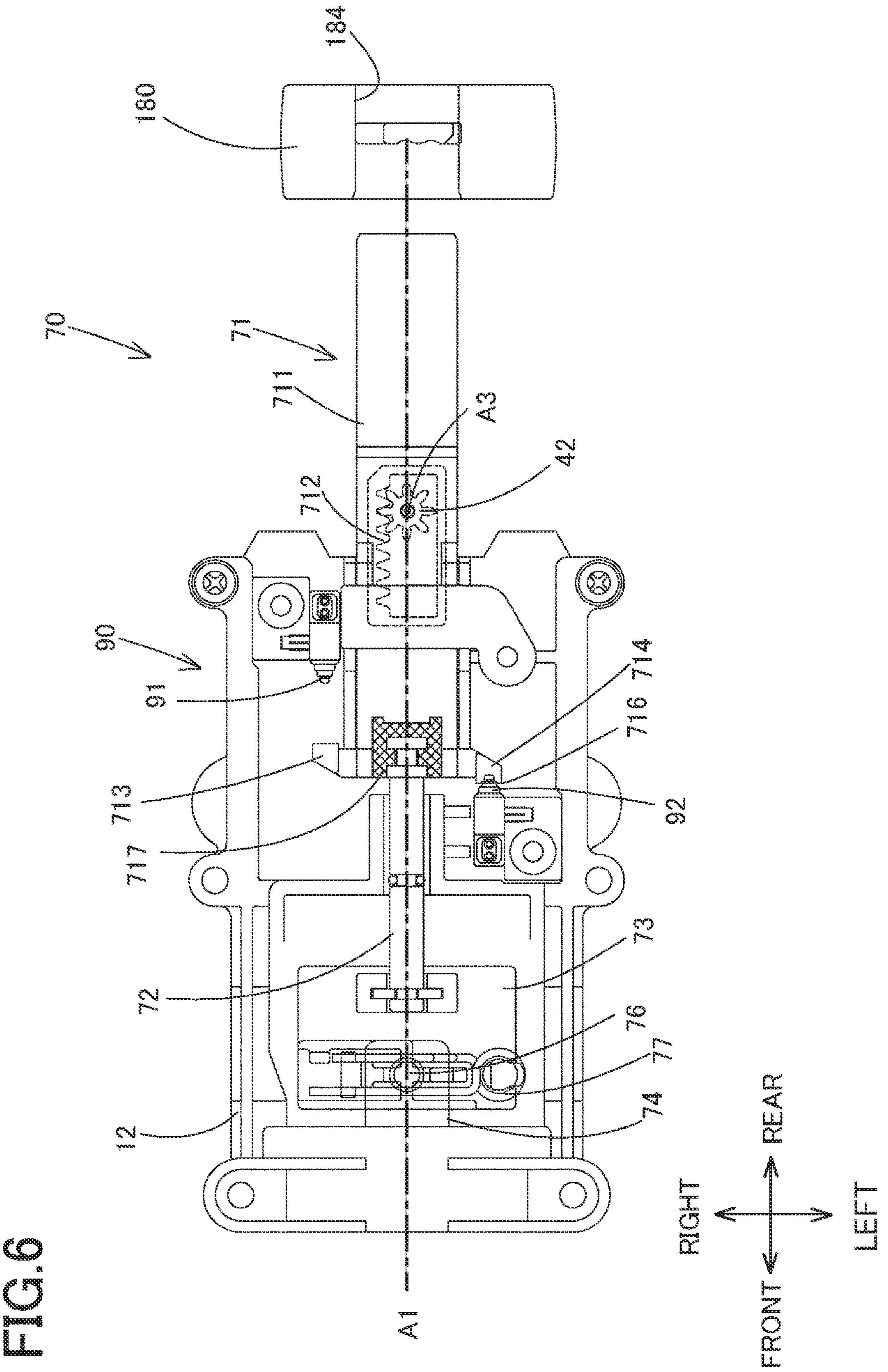
FIG. 6 is an upper view showing a connecting member and a lock lever in the hammer mode.

The second rack gear 712 is engaged with the second pinion gear 42 on the upper portion of the first shaft 43. As shown in FIGS. 2 and 6, the second rack gear 712 is provided on a first member 71 that extends in the front-rear direction in an upper portion of the first converting mechanism 40. The first member 71 having the second rack gear 712 is moved in parallel to the driving axis A1 (in the front-rear direction) by rotation of the second pinion gear 42 around the rotational axis A3. In this manner, the first converting mechanism 40 converts movement of the mode changing operation part 6 in the left-right direction into linear motion parallel to the driving axis A1.

The connecting member 70 is described now. As shown in FIGS. 2 and 6, the connecting member 70 includes the first member 71 having the second rack gear 712, a second member 72, a third member 73, and an engagement arm 74 that is engaged with the driving sleeve 55. These members are connected in series in this order from rear to front and arranged within the gear housing 12 so as to be integrally movable in the front-rear direction. The connecting member 70 is moved in the front-rear direction via the second rack gear 712 by rotation of the second pinion gear 42. The connecting member 70 is configured to move the driving sleeve 55 to the position Ph by moving to the foremost position within the moving range and to move the driving sleeve 55 to the position Pd by moving to the rearmost position within the moving range. Further, the connecting member 70 has such a length in the front-rear direction as to move to the foremost position when the mode changing operation part 6 is moved to the position P2 and to move to the rearmost position when the mode changing operation part 6 is moved to the position P1.

The connecting member 70 is described in further detail. When the second pinion gear 42 rotates around the rotational axis A3, the second rack gear 712 is moved in the front-rear direction and thus the first member 71 is moved in the front-rear direction. In this embodiment, the first member 71 has a plate-like part 711 extending in the front-rear direction, and an upper projection 717 (see FIG. 2) formed at a front end of the plate-like part 711 and protruding upward from the plate-like part 711. The second rack gear 712 is provided on the plate-like part 711. As shown in FIG. 6, the first member 71 further has a right projection 713 protruding to the right from the front end portion of the plate-like part 711, and a left projection 714 protruding to the left from the front end portion of the plate-like part 711.

The second member 72 is a rod-like member extending in the front-rear direction. A rear end portion of the second member 72 is inserted into the upper projection 717 of the first member 71 and connected to the first member 71. In FIG. 6, a connection between the first member 71 and the second member 72 is shown by showing the inside of the upper projection 717. The third member 73 is a rectangular member and a front end portion of the second member 72 is connected to a rear end portion of the third member 73. The engagement arm 74 is an elongate plate-like member extending in the front-rear direction. As shown in FIG. 2, a rear end portion of the engagement arm 74 is connected to a front end portion of the third member 73. A bifurcated front end portion of the engagement arm 74 is bent downward like a hook and engaged with an annular groove 551 formed in an outer periphery of the driving sleeve 55. In this embodiment, a through hole is formed in the rear end portion of the engagement arm 74, and a connection pin 76 is inserted through the through hole. Further, a torsion spring 77 is held on a left front end portion of the third member 73, and a lower end portion of the connection pin 76 is pinched between two arms of the torsion spring 77 by biasing force of the torsion spring 77. One of the two arms that is arranged on the rear side of the connection pin 76 is engaged to the third member 73.

With the above-described structure, when the mode changing operation part 6 is moved rightward to the position P2 (see FIG. 5), the first converting mechanism 40 converts the rightward movement of the mode changing operation part 6 into forward linear motion of the connecting member 70. Thus, the connecting member 70 moves to the foremost position within the moving range (see FIGS. 1, 2 and 6), and the driving sleeve 55 is moved to the position Ph (see FIG. 2). As a result, the action mode of the rotary hammer 100 is changed (set) to the hammer mode.

Figure 7:
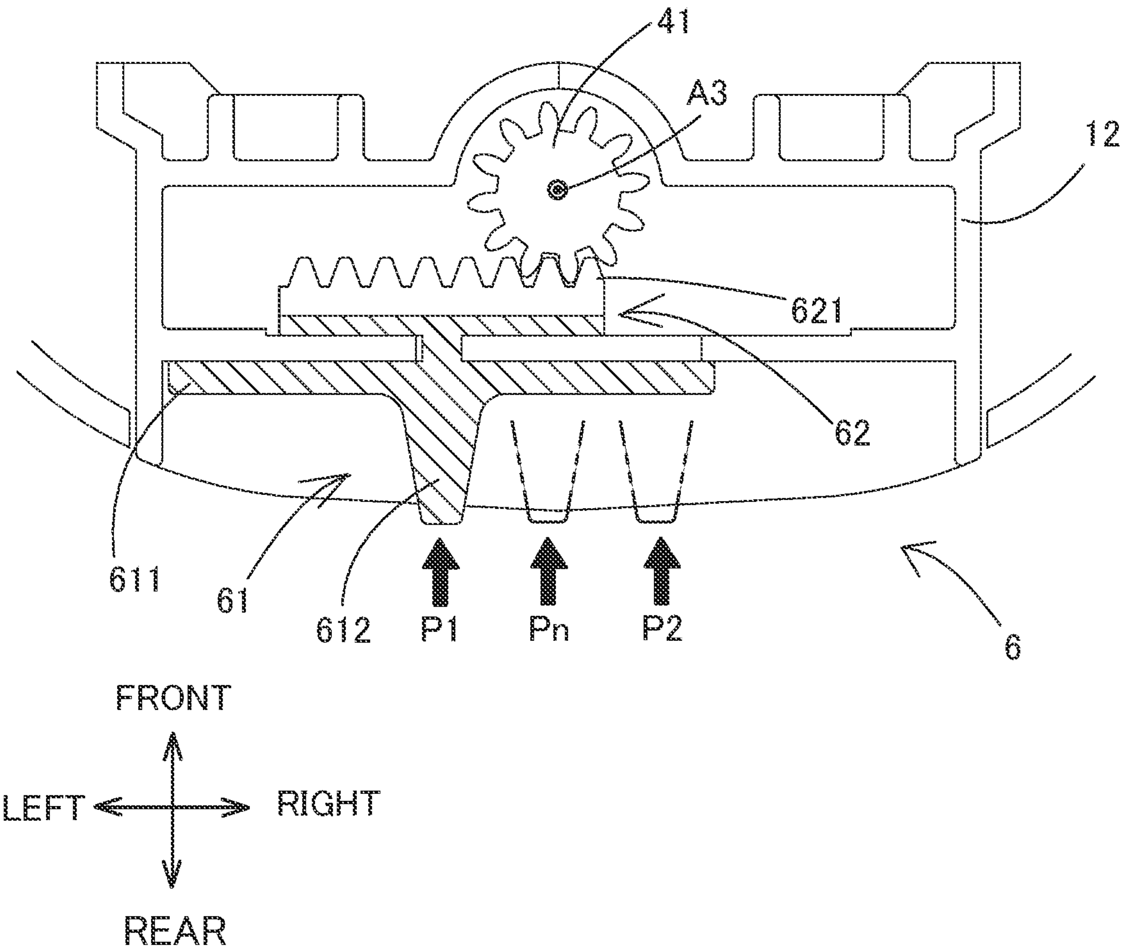
FIG. 7 is a sectional view corresponding to FIG. 5, showing the mode change operation part in a rotary hammer mode.
Figure 9:
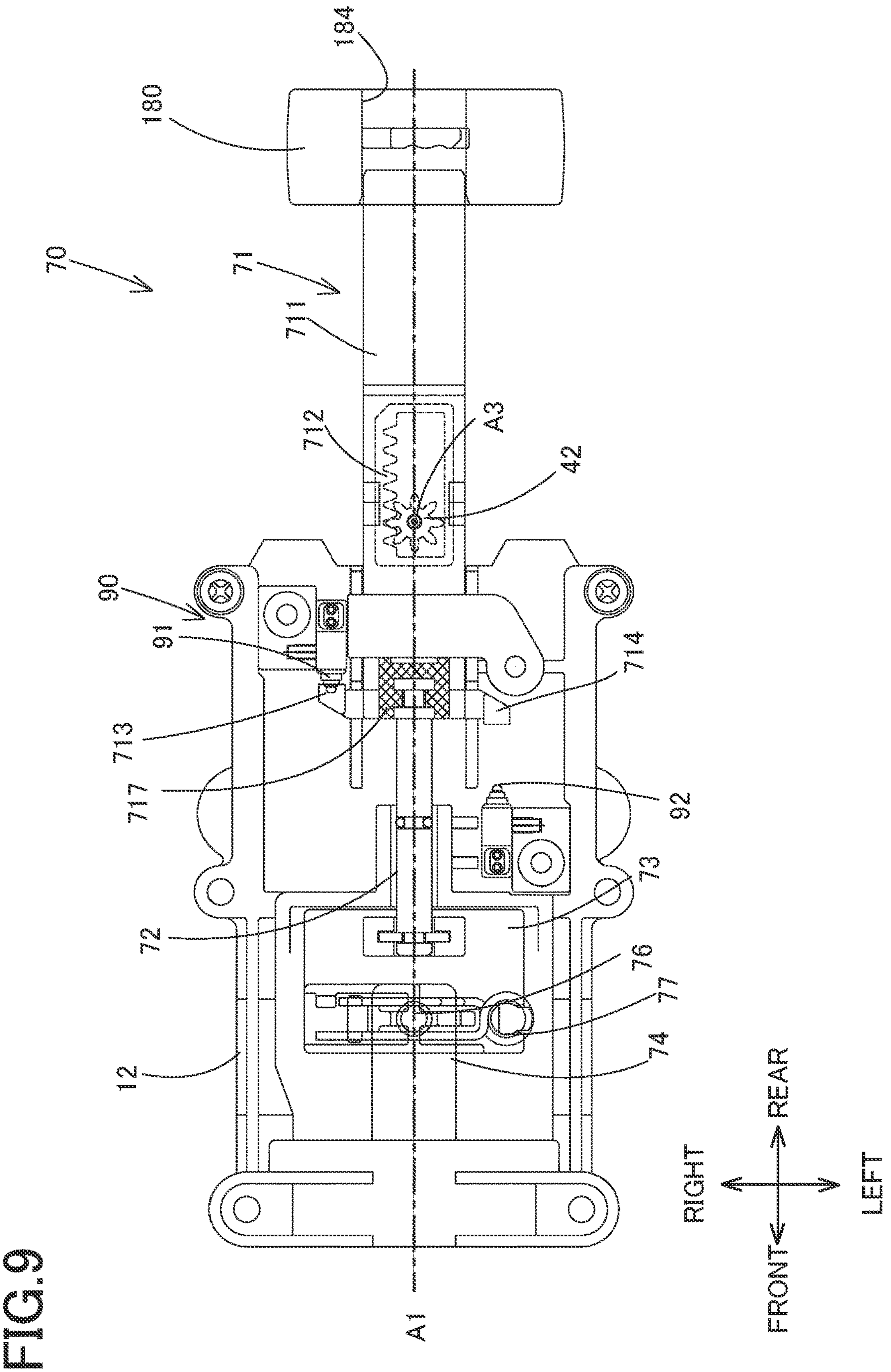
FIG. 9 is an upper view corresponding to FIG. 6, showing the connecting member and the lock lever in the rotary hammer mode.

When the mode changing operation part 6 is moved leftward to the position P1 as shown in FIG. 7, the first converting mechanism 40 converts the leftward movement of the mode changing operation part 6 into rearward linear motion of the connecting member 70. Thus, as shown in FIGS. 8 and 9, the connecting member 70 moves to the rearmost position within the moving range, and the driving sleeve 55 is moved to the position Pd. As a result, the action mode of the rotary hammer 100 is changed (set) to the rotary hammer mode.

Figure 10:
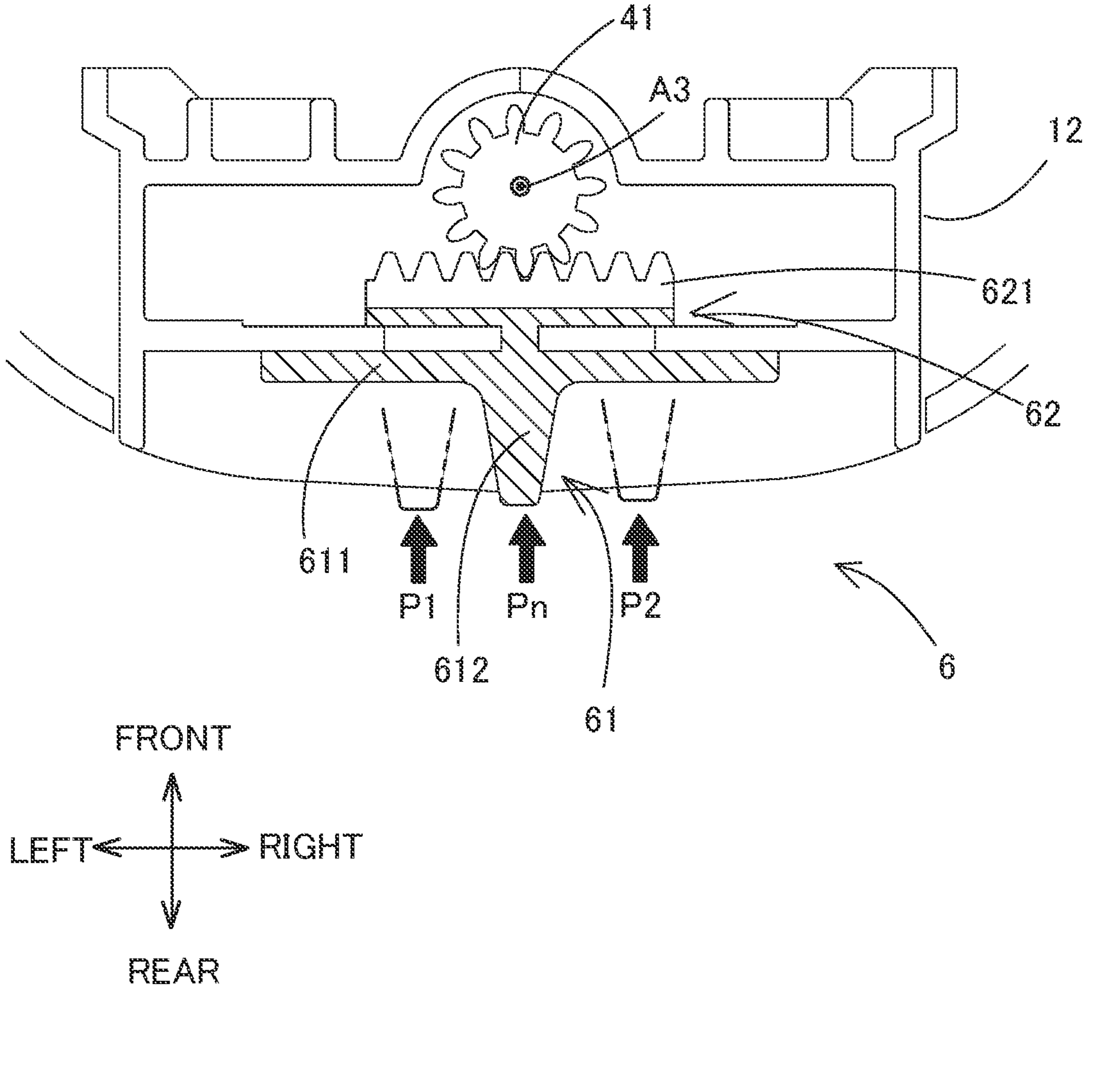
FIG. 10 is a sectional view corresponding to FIG. 5, showing the mode change operation part in a neutral mode.
Figure 12:
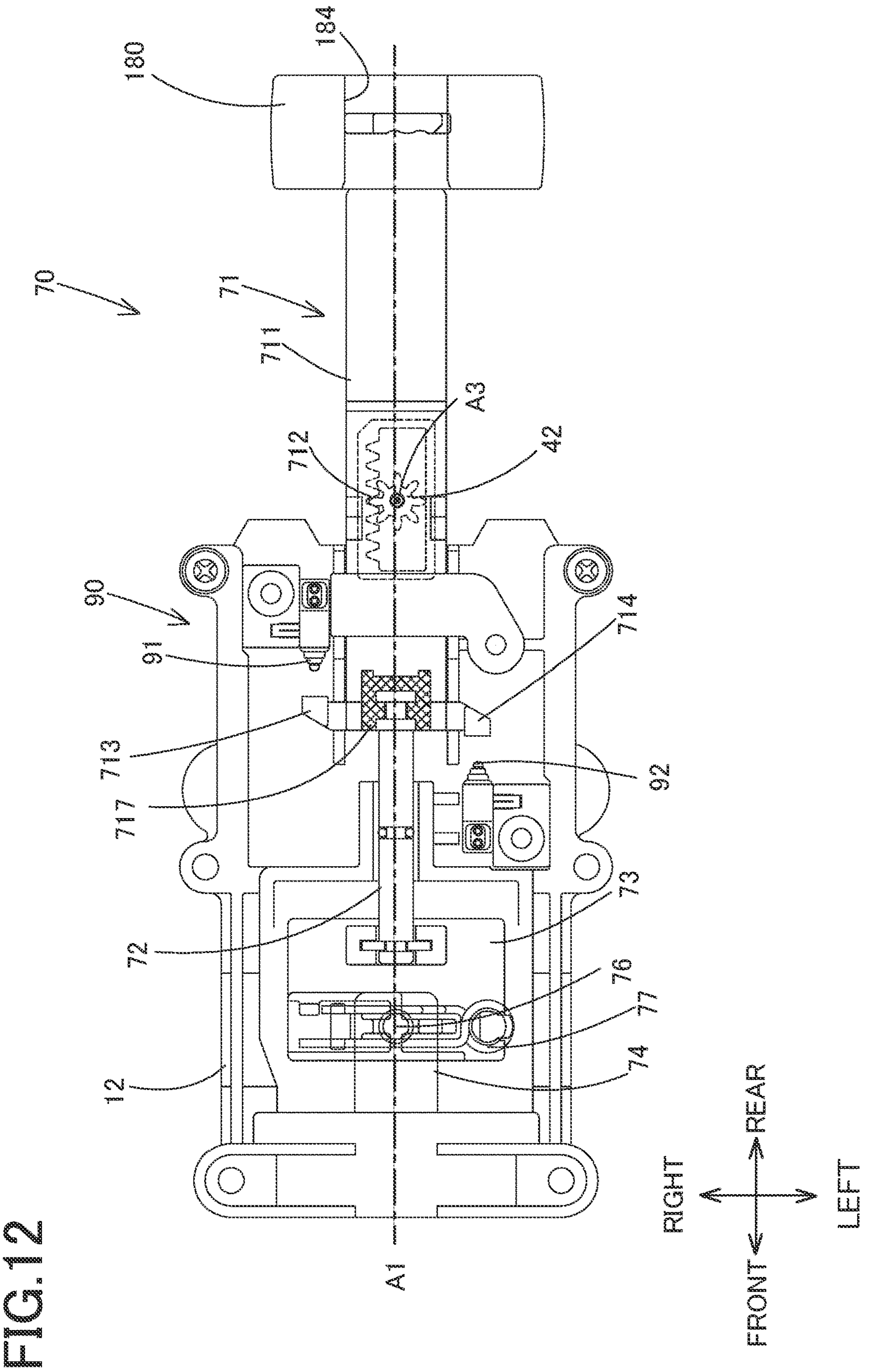
FIG. 12 is an upper view corresponding to FIG. 6, showing the connecting member and the lock lever in the neutral mode.

When the mode changing operation part 6 is moved rightward or leftward to the position Pn as shown in FIG. 10, the first converting mechanism 40 converts the rightward or leftward movement of the mode changing operation part 6 into forward or rearward linear motion of the connecting member 70 along the driving axis A1. Thus, as shown in FIGS. 11 and 12, the connecting member 70 moves to a position between the foremost position and the rearmost position within the moving range, and the driving sleeve 55 is moved to a position between the position Ph and the position Pd. As a result, the action mode of the rotary hammer 100 is changed to the neutral mode.

Figure 13:
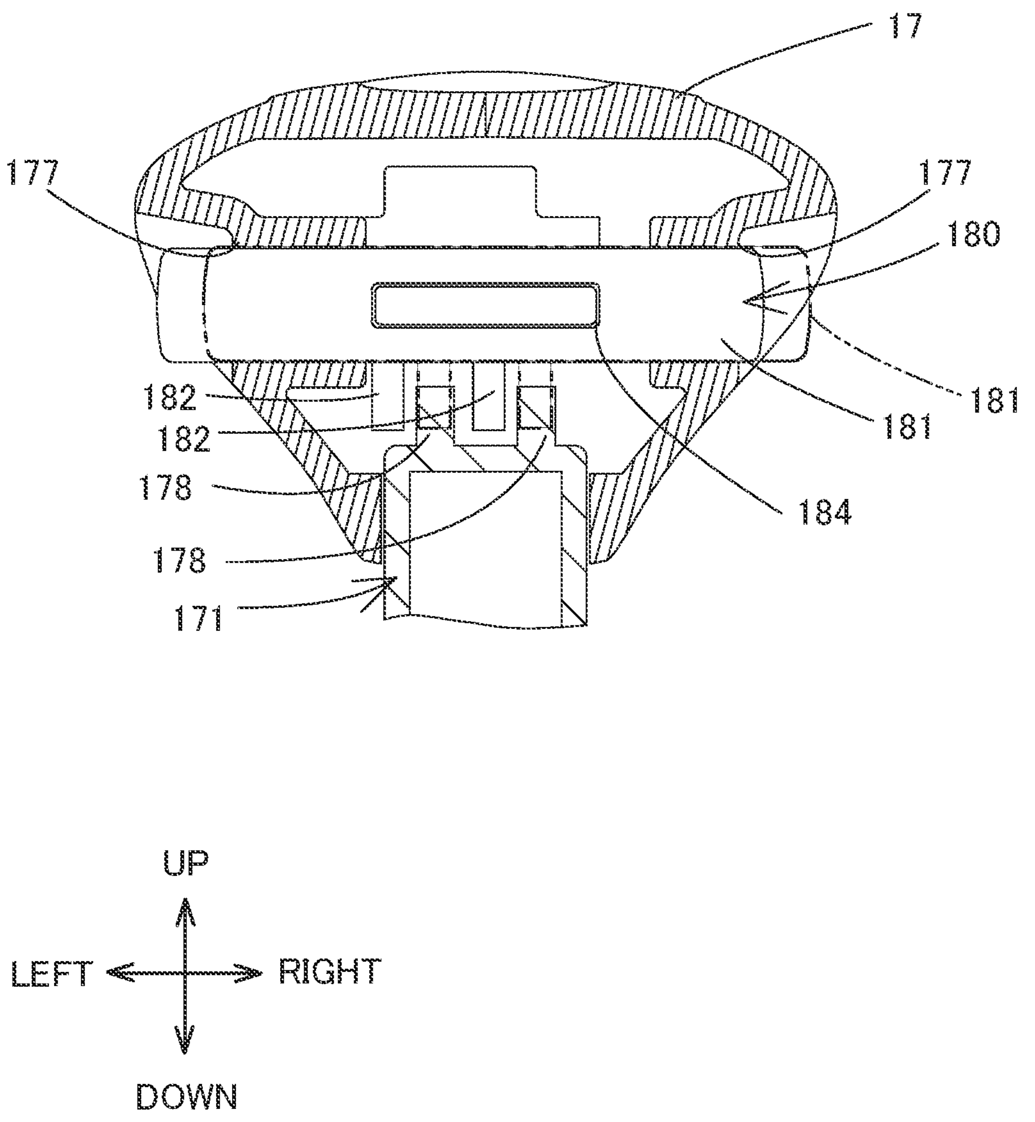
FIG. 13 is a sectional view taken along line XIII-XIII in FIG. 2, for illustrating a locking mechanism.
Figure 14:
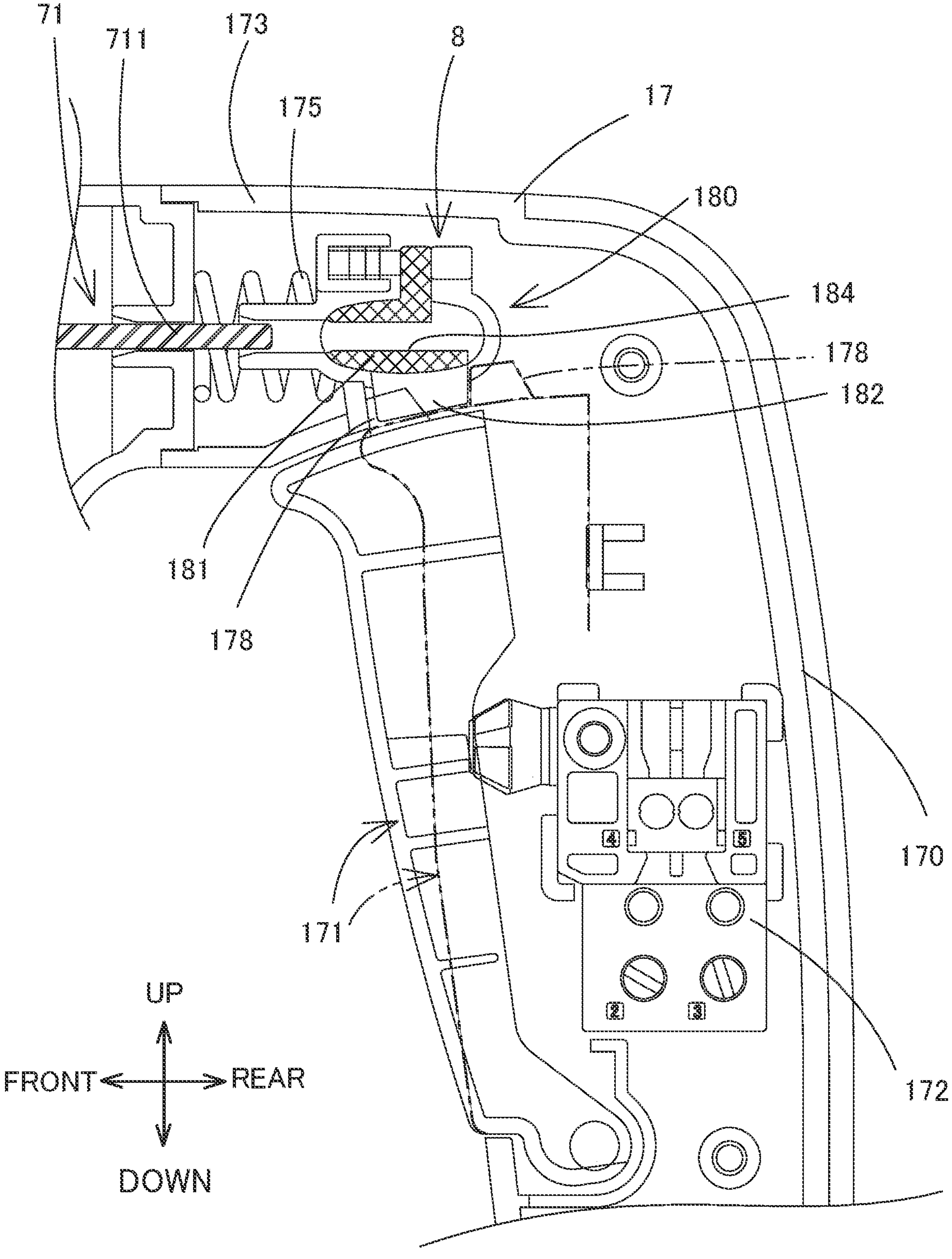
FIG. 14 is an enlarged, longitudinal section of the locking mechanism and its vicinity, for illustrating the locking mechanism and a switch lever in the hammer mode.

The locking mechanism 8 is now described with reference to FIGS. 13 to 15. In this embodiment, the locking mechanism 8 includes a lock lever 180 and the first member 71.

The lock lever 180 is provided directly above the switch lever 171 in the upper end portion (in the vicinity of the connection part 173) of the handle 17, and supported to be movable in the left-right direction relative to the handle 17. In this embodiment, the lock lever 180 has a rod-like body 181 extending in the left-right direction, and two locking pieces 182 protruding downward from a lower end of the body 181. As shown in FIG. 13, opposite end portions of the body 181 in the left-right direction are exposed through openings 177 formed in left and right walls of the connection part 173. A user can manually operate (manipulate) the lock lever 180 by pushing the body 181 to the left or right into the handle 17.

The switch lever 171 of this embodiment has two locking projections 178 protruding upward. As shown in solid lines in FIG. 13, the two locking pieces 182 of the lock lever 180 are spaced apart from each other in the left-right direction such that one of the locking projections 178 of the switch lever 171 can pass between the locking pieces 182. As shown in two-dot chain lines in FIG. 13, the distance between the two locking pieces 182 of the lock lever 180 is equal to the distance between the two locking projections 178 of the switch lever 171.

The lock lever 180 can be moved to a lock position, in which the lock lever 180 can lock the switch lever 171 in the ON position, and to a non-lock position, in which the lock lever 180 cannot lock the switch lever 171 in the ON position. More specifically, the lock position is a position of the lock lever 180 where the locking pieces 182 of the lock lever 180 are respectively on moving paths of the locking projections 178 of the switch lever 171 as shown in two-dot chain lines in FIG. 13. In the lock position, rear ends of the locking pieces 182 of the lock lever 180 can abut on front ends of the locking projections 178 of the switch lever 171 in the ON position, so that the switch lever 171 can be held in the ON position. The non-lock position is a position of the lock lever 180 where the locking pieces 182 of the lock lever 180 are respectively out of the moving paths of the locking projections 178 of the switch lever 171 as shown in solid lines in FIG. 13. In the non-lock position, the locking pieces 182 do not interfere with movement of the locking projections 178 in the front-rear direction, so that the switch lever 171 can be moved between the ON position and the OFF position. The lock lever 180 is normally placed in the non-lock position (shown in solid lines in FIG. 13) by a user so as to allow operation of the switch lever 170, and is moved to the lock position by the user only when locking the switch lever 170 in the ON position. Although not shown, in this embodiment, the lock lever 180 is held in the non-lock position or in the lock position by biasing force of a biasing member.

The lock lever 180 has a lock hole 184 formed in a substantially central portion of the body 181 in the left-right direction and extending through the body 181 in the front-rear direction. The lock hole 184 has a height in the up-down direction and a width in the left-right direction to allow insertion of the plate-like member 711 of the first member 71. The first member 71 forms part of the connecting member 70 as described above and moves in the front-rear direction in response to the user's operation of the mode changing operation part 6.

The positional relation between the connecting member 70 and the lock hole 184 is shown in FIGS. 6, 9 and 12. The plate-like member 711 of the first member 71 extends in the front-rear direction. The plat-like member 711 is configured such that, when the mode changing operation part 6 is moved to the position P1 (i.e. when the rotary hammer mode is selected), the plate-like member 711 is moved to the rearmost position within the moving range by the first converting mechanism 40 and engaged with the lock hole 184. The plate-like member 711 is also configured such that, when the mode changing operation part 6 is moved to the position Pn or P2 (i.e. when the neutral mode or the hammer mode is selected), the plate-like member 711 is moved forward from the rearmost position by the first converting mechanism 40 and disengaged from the lock hole 184.

Figure 15:
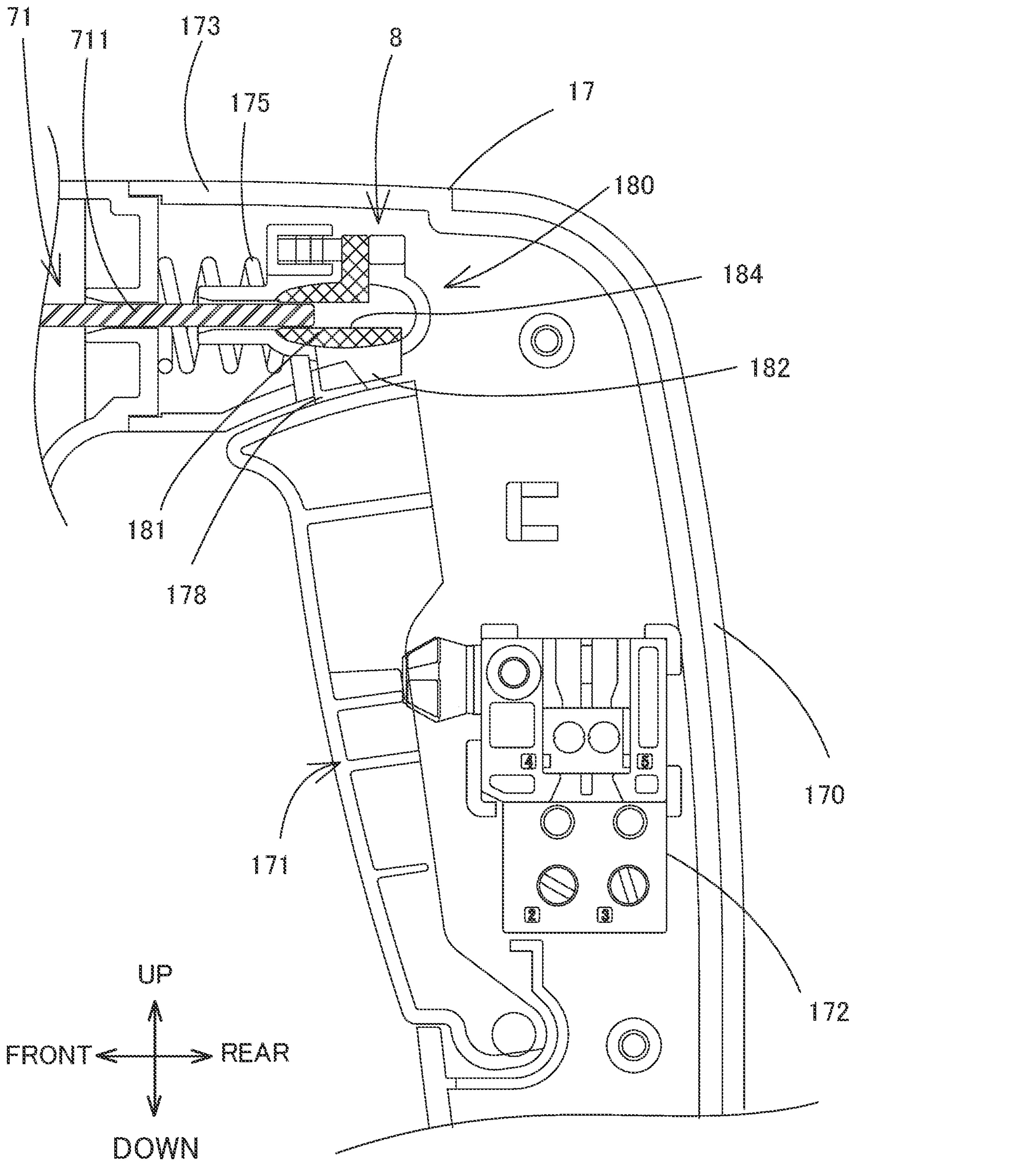
FIG. 15 is an enlarged, longitudinal section of the locking mechanism and its vicinity, for illustrating the locking mechanism and the switch lever in the rotary hammer mode.

With the above-described structure, when the mode changing operation part 6 is moved to the position P1 (i.e. when the rotary hammer mode is selected), the connecting member 70 is moved to the rearmost position within the moving range and the plate-like member 711 is engaged with the lock hole 184 (see FIGS. 9 and 15). Thus, the lock lever 180 is restrained from moving in the left-right direction by the first member 71 and locked in the non-lock position. When the mode changing operation part 6 is moved to the position P2 (i.e. when the hammer mode is selected), the connecting member 70 is moved to the foremost position within the moving range and the plate-like member 711 is disengaged from the lock hole 184 (see FIGS. 6 and 14). Thus, the lock lever 180 can be moved in the left-right direction. In this state, when the lock lever 180 is moved to the lock position by a user, the switch lever 171 is held in the ON position. Thus, in the hammer mode, the user can keep the ON state of the switch lever 171 by pushing the lock lever 180 to the lock position, without continuing manually depressing the switch lever 171.

Next, the mode detecting part 90 of the rotary hammer 100, and control of the motor 2 by the controller 9 using the mode detecting part 90 and the acceleration sensor 95 are now described.

First, the mode detecting part 90 is described. The mode detecting part 90 is configured to detect the action mode (a current actual action mode (currently selected operation mode), or specifically, the position of the driving sleeve 55). In this embodiment, the mode detecting part 90 includes a first switch 91 and a second switch 92 that are arranged in an upper part of the gear housing 12. In this embodiment, the first and second switches 91, 92 are push type micro switches. The first and second switches 91, 92 are configured to output a signal (ON signal) to the controller 9 when pushed.

The first switch 91 is arranged behind the right projection 713 of the first member 71 to face the right projection 713, and fixed to the gear housing 12. The positional relation between the right projection 713 and the first switch 91 is adjusted such that a rear end surface of the right projection 713 abuts on the first switch 91 and pushes the first switch 91 rearward when the connecting member 70 is moved to the rearmost position (i.e. when the driving sleeve 55 is moved to the position Pd). The second switch 92 is arranged in front of the left projection 714 of the first member 71 to face the left projection 714, and fixed to the gear housing 12. The positional relation between the left projection 714 and the second switch 92 is adjusted such that a front end surface of the left projection 714 abuts on the second switch 92 and pushes the second switch 92 forward when the connecting member 70 is moved to the foremost position (i.e. when the driving sleeve 55 is moved to the position Ph).

With such a structure, the controller 9 can determine (detect) the action mode of the rotary hammer 100 from detection results of the first and second switches 91, 92 (i.e. the position of the driving sleeve 55). Specifically, the action mode of the rotary hammer 100 is determined as the rotary hammer mode if an ON signal is outputted from the first switch 91 to the controller 9, and determined as the hammer mode if an ON signal is outputted from the second switch 92 to the controller 9. If an ON signal is not outputted from the first and second switches 91, 92, the action mode is determined as the neutral mode.

Control of the motor 2 by the controller 9 based on detection results of the mode detecting part 90 and the acceleration sensor 95 is now described. In the rotary hammer mode, which involves rotating motion, if the tool accessory 101 is jammed on the workpiece and the tool holder 30 cannot rotate (is locked or blocked), excessive reaction torque may act on the tool body 10 and cause excessive rotation (kickback) of the tool body 10 around the driving axis A1.

In this embodiment, when the motor 2 is driven, the controller 9 obtains detection results of the acceleration sensor 95 and successively determines whether the detection results exceed a predetermined threshold. The threshold is a threshold of acceleration obtained in the state of excessive rotation of the tool body 10 around the driving axis A1, and is stored in advance in a memory of the controller 9. The threshold can be obtained by experiment or simulation.

Further, the controller 9 determines whether the action mode is the rotary hammer mode, based on detection results of the mode detecting part 90. In this embodiment, when receiving an ON signal from the first switch 91, the controller 9 determines that the action mode is the rotary hammer mode.

When the acceleration exceeds the threshold and the action mode is the rotary hammer mode, the controller 9 stops driving of the motor 2. This eliminates the state of excessive rotation of the rotary hammer 100. When not receiving an ON signal from the first switch 91 (i.e. when the detection results of the mode detecting part 90 do not indicate the rotary hammer mode) even if the detection results of the acceleration sensor 95 exceed the threshold, the controller 9 continues driving of the motor 2. This allows the user to continue operation in the hammer mode even if the detection results of the acceleration sensor 95 temporarily exceed the threshold, for example, due to impact of contact of the rotary hammer 100 with a wall or the like around the workpiece during operation in the hammer mode.

The above-described rotary hammer 100 according to this embodiment has the following effects.

In the rotary hammer 100 of this embodiment, the mode changing operation part 6 for changing the action mode is on the tool body 10 and faces the grip part 170. Thus, this eliminates or reduces the possibility of collision of the mode changing operation 6 with the ground or a wall or the like, for example, even if the rotary hammer 100 is unintentionally dropped and collides therewith. Thus, the possibility of damage to the mode changing operation part 6 due to external impact on the rotary hammer 100 is reduced.

In the rotary hammer 100, the distance (center height) from the driving axis A1 to an outer surface around the driving axis A1 in the rotary hammer 100 can be shortened, compared with a structure in which an operation part for changing the action mode is arranged on a surface (such as an upper surface or a side surface) of the rotary hammer 100 around the driving axis A1. This can improve the maneuverability of the rotary hammer 100.

Further, in the rotary hammer 100, the outer surface around the driving axis A1 can be formed flat and smooth, compared with a structure in which the operation part for changing the action mode is arranged on a surface (such as the upper surface or the side surface) of the rotary hammer 100 around the driving axis A1. Therefore, according to this embodiment, the rotary hammer 100 is provided with improved designability.

The mode changing operation part 6 faces the switch lever 171 on the tool body 10. This allows the user to operate the mode changing operation part 6 and the switch lever 171 with the same hand, and thus, for example, to change the operation mode and start the motor 2 without moving an arm of the user. Therefore, according to this embodiment, the rotary hammer 100 is provided with improved maneuverability.

The rotary hammer 100 has the transmitting mechanism 4 that is configured to transmit movement of the mode changing operation part 6 to the driving sleeve 55 and move the driving sleeve 55 in parallel to the driving axis A1. Thus, the transmitting mechanism 4 can transmit movement of the mode changing operation part 6 (provided in a position facing the grip part 170) in the left-right direction to the driving sleeve 55 (provided onto the tool holder 30 configured to be rotationally driven around the driving axis A1).

Further, the transmitting mechanism 4 is configured to, when the mode changing operation part 6 is moved to the position P1, move the driving sleeve 55 to the position Pd and thereby transmit torque of the motor 2 to the tool holder 30. The transmitting mechanism 4 is further configured to, when the mode changing operation part 6 is moved to the position P2, move the driving sleeve 55 to the position Ph and thereby interrupt the torque transmission. Therefore, in the rotary hammer 100, by user's manual operation of the mode changing operation part 6, the driving sleeve 55 is moved to switch the action mode between the rotary hammer mode and the hammer mode.

The transmitting mechanism 4 includes the first converting mechanism 40 configured to convert linear sliding movement of the mode changing operation part 6 in the left-right direction into rotating motion and further convert the rotating motion into linear motion along the driving axis A1. Therefore, in the rotary hammer 100, compared with a structure not having the first converting mechanism 40, the degrees of freedom in arrangement of the driving sleeve 55 and the mode changing operation part 6 and in configuration of the transmitting mechanism 4 are enhanced.

The leaf springs 125 are arranged on upper and lower sides of the base 62 of the mode changing operation part 6 and held by the gear housing 12, and the mode changing operation part 6 is configured to be held in the position P1 corresponding to the rotary hammer mode or the position P2 corresponding to the hammer mode by the biasing force of the leaf springs 125. Therefore, according to this embodiment, the rotary hammer 100 is provided that facilitates moving the mode changing operation part 6 in the left-right direction and positioning it in the position P1 or P2.

The rotary hammer 100 of this embodiment has the locking mechanism 8. The locking mechanism 8 is configured such that, in the hammer mode in which the tool accessory 101 produces (provides) hammering only motion, the first member 71 is not engaged with the lock lever 180 and thus allows the lock lever 180 to move to the lock position. Therefore, the user need not continue manually depressing the switching lever 171 during operation of continuously performing hammering only motion for a relatively long time. Thus, the burden on the user during the operation can be reduced. Further, the locking mechanism 8 is configured such that, in the rotary hammer mode in which the tool accessory 101 produces (provides) rotating motion, the first member 71 is engaged with the lock lever 180 and holds the lock lever 180 in the non-lock position. Thus, the user can stop driving of the motor 2 simply by releasing the switch lever 171, for example, even if the tool accessory 101 is jammed on the workpiece. Therefore, the rotary hammer 100 can be provided with high safety.

The rotary hammer 100 has the mode detecting part 90 and the acceleration sensor 95, and the controller 9 is configured to stop driving of the motor 2 when determining excessive rotation of the tool body 10 around the driving axis A1 based on detection results of the acceleration sensor 95 and determining that the operation mode is the rotary hammer mode based on detection results of the mode detecting part 90. Thus, the safety of the rotary hammer 100 can be enhanced. Further, in the hammer mode, the controller 9 is configured to continue driving of the motor 2 even if the detection results of the acceleration sensor 95 indicate occurrence of excessive rotation of the tool body 10 around the driving axis A1. Thus, the user can continue operation in the hammer mode even if the detection results of the acceleration sensor 95 temporarily indicate occurrence of excessive rotation of the tool body 10, for example, due to impact of contact of the rotary hammer 100 with a wall or the like around the workpiece during operation in the hammer mode. Therefore, the possibility that the motor 2 is stopped during the hammer mode without user's intention is reduced. Thus, according to this embodiment, the rotary hammer 100 can be provided with improved safety and maneuverability.

In the rotary hammer 100, the acceleration sensor 95 is housed within the handle 17, and the tool holder 10 and the handle 17 are connected via the elastic members 175, 176. This structure can reduce transmission of vibration from the tool body 10 to the acceleration sensor 95 and thus prolongs the life of the acceleration sensor 95.

Further, in this embodiment, the acceleration sensor 95 is housed within a lower part of the handle 17. Therefore, the accuracy of detecting rotation of the tool body 10 around the driving axis A1 can be enhanced, compared with a structure in which the acceleration sensor 95 is housed within an upper portion of the handle 17 or other positions close to the driving axis A1.

Correspondences

Correspondences between the features of the above-described embodiment and the features of the present disclosure are as follows. The features of the above-described embodiment are merely exemplary and do not limit the features of the present disclosure.

The rotary hammer 100 is an example of the "power tool having a rotary hammer mechanism".

The motor 2 is an example of the "motor".

The tool accessory 101 is an example of the "tool accessory".

The driving axis A1 is an example of the "driving axis".

The rotary hammer mode is an example of the "first mode".

The hammer mode is an example of the "second mode".

The driving mechanism 3 is an example of the "driving mechanism".

The tool body 10 is an example of the "tool body".

The grip part 170 is an example of the "grip part".

The handle 17 is an example of the "handle".

The mode changing operation part 6 is an example of the "first operation member".

The switch lever 171 is an example of the "second operation member".

The positions P1 and P2 are examples of the "first position" and the "second position", respectively.

The tool holder 30 is an example of the "tool holder".

The driving sleeve 55 is an example of the "clutch member".

The positions Pd and Ph are examples of the "third position" and the "fourth position", respectively.

The transmitting mechanism 4 is an example of the "transmitting mechanism".

The first converting mechanism 40 is an example of the "converting mechanism".

The first pinion gear 41 and the second pinion gear 42 are examples of the "at least one pinion gear".

The first rack gear 621 and the second rack gear 712 are examples of the "first rack gear" and the "second rack gear", respectively.

The leaf spring 125 is an example of the "biasing member".

The lock lever 180 is an example of the "locking member".

The first member 71 is an example of the "lock controlling member".

The first switch 91 and the mode detecting part 90 are examples of the "mode detecting part".

The acceleration sensor 95 is an example of the "rotation detecting part".

The controller 9 is an example of the "controlling part".

The elastic members 175, 176 are examples of the "elastic member".

Other Embodiments

In the above-described embodiment, the rotary hammer 100 may be configured to be operated by power supplied not from an external AC power source but from a rechargeable battery. In this case, in place of the power cord 19, a battery mounting part, which is configured to removably receive the battery, may be provided, for example, in a lower end portion of the handle 17.

The mode changing operation part 6 may be provided, for example, on a rear wall of the motor housing 13, as long as the mode changing operation part 6 faces the grip part 170. This structure also reduces the possibility of damage to the mode changing operation part 6 due to drop of the rotary hammer 100.

The mode changing operation part 6 may be configured to be linearly moved not only in the left-right direction but, for example, in the up-down direction. Further, the moving path of the mode changing operation part 6 may not be linear but, for example, arcuate.

It may be sufficient for the mode detecting part 90 to detect at least the rotary hammer mode and thus, for example, the mode detecting part 90 may not have the second switch 92. In this case, the controller 9 may be configured to, when the detection results of the acceleration sensor 95 exceed the threshold, stop driving of the motor 2 if receiving a signal that the first switch 91 has been pushed, while continuing driving of the motor 2 if not receiving the signal that the first switch 91 has been pushed. Further, the mode detecting part 90 is not limited to the push type micro switch, but may include a detector(s) of a different type that is configured to detect the position (movement) of the driving sleeve 55. Examples of the detector may include a contact type detector (e.g., a switch of other type), a non-contact type detector (e.g., a magnetic sensor and an optical sensor).

The rotary hammer 100 may have any other detecting device capable of detecting the state of rotation of the tool body 10 around the driving axis A1, in place of the acceleration sensor 95. Examples of the detecting device may include a speed sensor, an angular speed sensor and an angular acceleration sensor.

In the above-described embodiment, the rotary hammer 100 is capable of operating in an operation mode, which is selected from the plurality of action modes including the rotary hammer mode and the hammer mode. The above-described embodiment may however be applied to a power tool having a rotary hammer mechanism that is configured to selectively operate in any of the rotary hammer mode, the hammer mode and a rotation mode. In this case, in the rotation mode, driving of the motor 2 may be controlled in the same manner as in the rotary hammer mode.

In the above-described embodiment, the first converting mechanism 40 has the first rack gear 621, the first pinion gear 41, the first shaft 43, the second pinion gear 42 and the second rack gear 712. Alternatively, a common pinion gear may be engaged with the first rack gear 621 and the second rack gear 712. In other words, the first converting mechanism 40 may employ a single pinion gear. For example, the first converting mechanism 40 may be formed by the first rack gear 621, a pinion gear engaged with the first rack gear 621, and the second rack gear 712 engaged with the pinion gear. In this case, the pinion gear can convert sliding movement of the first rack gear 621 in the left-right direction into rotating motion and then convert the rotating motion into linear motion of the second rack gear 712 in parallel to the driving axis A1.

The structure of the transmitting mechanism 4 is not limited to the structure of the above-described embodiment, as long as the transmitting mechanism 4 is configured to move the driving sleeve 55 along the driving axis A1 in response to the sliding movement of the mod changing operation part 6 within the predetermined range. In the case of the transmitting mechanism 4 having the connecting member 70, it is sufficient for the connecting member 70 to connect the first converting mechanism 40 and the driving sleeve 55, and the number and structures of parts (components, elements) of the connecting member 70 and connection between the parts are not limited to those of the above-described embodiment.

In the above-described embodiment, the drive control of the motor 2 is executed by a CPU, but other kinds of control circuits, including programmable logic devices such as an ASIC (application specific integrated circuit) and an FPGA (field programmable gate array), may be adopted in place of the CPU. The drive control of the motor 2 may be executed by a plurality of control circuits in a distributed manner.

DESCRIPTION OF THE REFERENCE NUMERALS

2: motor, 3: driving mechanism, 4: transmitting mechanism, 6: mode changing operation part, 8: locking mechanism, 9: controller, 10: tool body, 12: gear housing, 13: motor housing, 17: handle, 19: power cord, 20: motor body, 21: stator, 22: rotor, 25: motor shaft, 29: driving gear, 30: tool holder, 31: motion converting mechanism, 33: striking mechanism, 35: rotation transmitting mechanism, 36: intermediate shaft, 40: first converting mechanism, 41: first pinion gear, 42: second pinion gear, 43: first shaft, 54: clutch mechanism, 55: driving sleeve, 56: gear sleeve, 61: main operation part, 62: base, **62*p*1: recess, 62*p*2: recess, 62*pn*: recess, 70: connecting member, 71: first member, 72: second member, 73: third member, 74: engagement arm, 76: connection pin, 77: torsion spring, 90: mode detecting part, 91: first switch, 92: second switch, 95: acceleration sensor, 100: rotary hammer, 101: tool accessory, 121: rear wall, 122: opening, 125: leaf spring, 126: projection, 132: rear wall, 170: grip part, 171: switch lever, 171: main switch, 173: connection part, 174: connection part, 175: elastic member, 177: opening, 178: locking projection, 180: lock lever, 181: body, 182: locking piece, 184: lock hole, 301: lock ring, 311: crank shaft, 312: driven gear, 313: connecting rod, 315: piston, 317: cylinder, 331: striker, 333: impact bolt, 335: air chamber, 361: small bevel gear, 362: driven gear, 551: annular groove, 561: large bevel gear, 611: plate part, 612: lever, 621: first rack gear, 711: plate part, 712: second rack gear, 713: right projection, 714: left projection, 717**: upper projection, A1: driving axis, A2: rotational axis, A3: rotational axis

The invention claimed is:

1. A power tool having a rotary hammer mechanism, comprising:

a motor;

a driving mechanism that is configured to operate by power of the motor in an action mode that is selected from a plurality of action modes including a first mode of at least rotationally driving a tool accessory around a driving axis and a second mode of only linearly driving the tool accessory along the driving axis;

a tool body that houses the motor and the driving mechanism;

a handle having a grip part that extends in a first direction crossing the driving axis and is configured to be held by a user;

a first operation member that (i) is on the tool body, (ii) directly faces the grip part in a second direction parallel to the driving axis with no structure between the grip part and the first operation member, (iii) is configured to be manually operated by the user to select the action mode of the driving mechanism between at least the first mode and the second mode, and (iv) is configured to be manually slid only in a third direction, perpendicular to both the first and second directions;

a tool holder that is configured to removably hold the tool accessory and to be rotationally driven around the driving axis by torque transmitted from the motor; and a clutch member that is on the tool holder, and that is movable along the driving axis in response to operation of the first operation member, and that is configured to transmit the torque when the clutch member is in a third position in a direction along the driving axis and to interrupt the torque transmission when the clutch member is in a fourth position different from the third position in the direction along the driving axis, wherein the first operation member is configured:

to be slidable within a predetermined range in the third direction, to change the action mode of the driving mechanism to the first mode when moved to a first position within the predetermined range, and to change the action mode of the driving mechanism to the second mode when moved to a second position different from the first position within the predetermined range, the driving mechanism is configured to operate in the first mode when the clutch member is in the third position, and to operate in the second mode when the clutch member is in the fourth position, the power tool having the rotary hammer mechanism further includes a transmitting mechanism that is configured to transmit sliding movement of the first operation member within the predetermined range to the clutch member to move the clutch member along the driving axis, and the transmitting mechanism includes a converting mechanism that is configured to convert linear sliding movement of the first operation member within the predetermined range into rotating motion and further convert the rotating motion into linear motion along the driving axis.

2. The power tool as defined in claim 1, wherein:

the grip part includes a second operation member that is configured to be normally held in an OFF position and to be moved to an ON position to drive the motor when manually depressed by the user, and the first operation member faces the second operation member in the second direction.

3. The power tool as defined in claim 1, wherein:

the converting mechanism includes:

a first rack gear that slides in response to the linear sliding movement of the first operation member within the predetermined range, a first pinion gear that is engaged with the first rack gear, a second pinion gear that rotates in response to rotation of the first pinion gear, and a second rack gear that is engaged with the second pinion gear and converts the rotating motion of the second pinion gear into the linear motion along the driving axis.

4. The power tool as defined in claim 1, further comprising:

a biasing member configured to bias the first operation member, wherein the first operation member is configured to be held in the first position or the second position by biasing force of the biasing member.

5. The power tool as defined in claim 1, wherein:

the grip part includes a second operation member that is configured to be normally held in an OFF position and to be moved to an ON position to drive the motor when manually depressed by the user, the power tool further comprising:

a locking member that is configured to be moved to a lock position to lock the second operation member in the ON position or to a non-lock position not to lock the second operation member in the ON position, in response to manual operation of the locking member by the user, and a lock controlling member that is movable along the driving axis, wherein the lock controlling member is configured such that:

(1) when the first mode is selected in response to operation of the first operation member by the user, the lock controlling member is in a position to interfere with the locking member to hold the locking member in the non-lock position, and (2) when the second mode is selected in response to the operation of the first operation member by the user, the lock controlling member is in a position not to interfere with the locking member to allow the locking member to move to the lock position.

6. The power tool as defined in claim 1, further comprising:

a mode detecting part that is configured to at least detect that the action mode of the driving mechanism is the first mode;

a rotation detecting part that is configured to detect a state of rotation of the tool body around the driving axis; and a controlling part that is configured to (i) control driving of the motor and (ii) stop driving of the motor when the mode detecting part detects that the action mode is the first mode and the state of rotation detected by the rotation detecting part is an excessive rotation of the tool body around the driving axis.

7. The power tool as defined in claim 6, further comprising:

an elastic member that connects the handle to the tool body such that the handle is movable along the driving axis relative to the tool body, wherein:

the rotation detecting part is housed within the handle.

8. The power tool as defined in claim 1, wherein:

at least a portion of the grip part is spaced from the tool body in the second direction;

the tool body has a rear wall spaced from the grip part in the second direction and facing the grip part; and the first operation member is in an opening in the rear wall.

9. The power tool has defined in claim 1, wherein the first operation member is below the driving axis in the first direction.

10. The power tool is defined and claim 1, wherein:

the tool body includes a circumferential surface that surrounds a part of the driving axis; and the first operation member is in a surface of the tool body other than the circumferential surface.

11. The power tool as defined in claim 1, wherein the first operation member includes a flat rectangular plate part extending in the third direction and a lever part protruding from a central portion of the plate part in the second direction.

12. A power tool having a rotary hammer mechanism, comprising:

a motor;

a driving mechanism that is configured to operate by power of the motor in an action mode that is selected from a plurality of action modes including a first mode of at least rotationally driving a tool accessory around a driving axis and a second mode of only linearly driving the tool accessory along the driving axis;

a tool body that houses the motor and the driving mechanism;

a handle having a grip part that extends in a direction crossing the driving axis and is configured to be held by a user;

a first operation member that (i) is on the tool body, (ii) faces the grip part, and (iii) is configured to (a) be manually operated by the user to change the action mode of the driving mechanism, (b) be slidable within a predetermined range in a direction crossing the driving axis, (c) change the action mode of the driving mechanism to the first mode when moved to a first position within the predetermined range, and (d) change the action mode of the driving mechanism to the second mode when moved to a second position different from the first position within the predetermined range;

a tool holder that is configured to removably hold the tool accessory and to be rotationally driven around the driving axis by torque transmitted from the motor;

a clutch member that is (i) on the tool holder, (ii) movable along the driving axis in response to the operation of the first operation member, and (iii) configured to transmit the torque when the clutch member is in a third position in a direction along the driving axis and to interrupt the torque transmission when the clutch member is in a fourth position different from the third position in the direction along the driving axis; and a transmitting mechanism that is configured to transmit sliding movement of the first operation member within the predetermined range to the clutch member to move the clutch member along the driving axis, wherein:

the driving mechanism is configured to operate in the first mode when the clutch member is in the third position, and to operate in the second mode when the clutch member is in the fourth position; and the transmitting mechanism includes a converting mechanism that is configured to convert linear sliding movement of the first operation member within the predetermined range into rotating motion and further convert the rotating motion into linear motion along the driving axis.

13. A power tool having a rotary hammer mechanism, comprising:

a motor;

a driving mechanism that is configured to operate by power of the motor in an action mode that is selected from a plurality of action modes including a first mode of at least rotationally driving a tool accessory around a driving axis and a second mode of only linearly driving the tool accessory along the driving axis;

a tool body that houses the motor and the driving mechanism;

a handle having a grip part that extends in a first direction crossing the driving axis and is configured to be held by a user;

a first operation member that (i) is on the tool body, (ii) directly faces the grip part in a second direction parallel to the driving axis with no structure between the grip part and the first operation member, (iii) is configured to be manually operated by the user to select the action mode of the driving mechanism between at least the first mode and the second mode, and (iv) is configured to be manually slid in a third direction, perpendicular to both the first and second directions, a clutch member that is movable along the driving axis in response to operation of the first operation member and configured to transmit torque; and a transmitting mechanism that is configured to transmit linear sliding movement of the first operation member to move the clutch member along the driving axis.

14. The power tool as defined in claim 13, wherein the first operation member is configured to be manually slid only in the third direction.

* * * * *